US010657629B2

(12) United States Patent
Takushima et al.

(10) Patent No.: US 10,657,629 B2
(45) Date of Patent: May 19, 2020

(54) IMAGE READING DEVICE

(71) Applicant: Mitsubishi Electric Corporation, Chiyoda-ku (JP)

(72) Inventors: Shigeru Takushima, Chiyoda-ku (JP); Hiroyuki Kawano, Chiyoda-ku (JP); Yoshitaka Toyoda, Chiyoda-ku (JP); Taku Matsuzawa, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/487,543

(22) PCT Filed: Apr. 2, 2018

(86) PCT No.: PCT/JP2018/014045
§ 371 (c)(1),
(2) Date: Aug. 21, 2019

(87) PCT Pub. No.: WO2018/198680
PCT Pub. Date: Nov. 1, 2018

(65) Prior Publication Data
US 2019/0370941 A1    Dec. 5, 2019

(30) Foreign Application Priority Data

Apr. 27, 2017 (JP) ................. 2017-088825

(51) Int. Cl.
*G06K 9/40* (2006.01)
*G06K 9/36* (2006.01)
(Continued)

(52) U.S. Cl.
CPC ............. *G06T 5/003* (2013.01); *H04N 1/028* (2013.01); *H04N 1/60* (2013.01); *H04N 1/193* (2013.01); *H04N 5/378* (2013.01)

(58) Field of Classification Search
USPC ............ 382/255, 284, 312; 348/208.4, 222.1
See application file for complete search history.

(56) References Cited

U.S. PATENT DOCUMENTS 8,823,809 B1 * 9/2014 Jensen .................... G06T 5/003
                                                        348/208.4
9,445,003 B1 * 9/2016 Lelescu .................. G06T 5/003
(Continued)

FOREIGN PATENT DOCUMENTS

JP      4-51672 A       2/1992
JP      2010-141558 A   6/2010
(Continued)

OTHER PUBLICATIONS

International Search Report dated Jun. 26, 2018 in PCT/JP2018/014045 filed on Apr. 2, 2018.

*Primary Examiner* — Kathleen Y Dulaney
(74) *Attorney, Agent, or Firm* — Oblon, McClelland, Maier & Neustadt, L.L.P.

(57) ABSTRACT

A memory stores image data generated by sensors included in an imager and containing a component data piece for each of color components that has undergone A/D conversion by an A/D converter. A width detector detects, based on the image data having undergone image processing by an image processor, the width along the main scanning direction of a duplicate area in which pieces of image data generated by adjoining sensors overlap each other. A displacement detector detects, based on the width of the duplicate area along the main scanning direction, a displacement of a scan target object for each of optical systems included in the imager. A first blur corrector performs blur correction on the component data piece using a point spread function for each of the color components that is dependent on a displacement of the scan target object. An adjuster adjusts, based on a transfer magnification dependent on a displacement of the scan
(Continued)

target object, the size of an image for each of the color components indicated by the component data piece. A combiner combines the images by superimposing portions of the component data pieces.

9 Claims, 24 Drawing Sheets

(51) Int. Cl.
    *H04N 5/228* (2006.01)
    *G06K 7/00* (2006.01)
    *G06T 5/00* (2006.01)
    *H04N 1/028* (2006.01)
    *H04N 1/60* (2006.01)
    *H04N 1/193* (2006.01)
    *H04N 5/378* (2011.01)

(56) References Cited

U.S. PATENT DOCUMENTS

| | | | | |
|---|---|---|---|---|
| 2010/0119146 A1* | 5/2010 | Inazumi | | G06T 5/003 382/153 |
| 2010/0171840 A1* | 7/2010 | Yonekura | | G06T 5/50 348/208.4 |
| 2011/0267507 A1* | 11/2011 | Kane | | G02B 27/0075 348/241 |
| 2012/0050580 A1* | 3/2012 | Iwasaki | | H04N 5/23212 348/240.99 |
| 2012/0314093 A1* | 12/2012 | Tamayama | | G06T 5/003 348/208.1 |
| 2013/0293704 A1* | 11/2013 | Imamura | | G01C 3/08 348/135 |
| 2015/0195461 A1* | 7/2015 | Kang | | H04N 5/23287 348/208.2 |
| 2015/0248776 A1* | 9/2015 | Kasahara | | G06T 11/006 348/222.1 |
| 2018/0013919 A1* | 1/2018 | Asamura | | H04N 1/387 |
| 2018/0324358 A1* | 11/2018 | Yamada | | H04N 5/2353 |
| 2019/0107688 A1* | 4/2019 | Nakajima | | G03B 5/00 |
| 2019/0132470 A1* | 5/2019 | Kawano | | H04N 1/19 |

FOREIGN PATENT DOCUMENTS

| | | |
|---|---|---|
| WO | WO 2013/080551 A1 | 6/2013 |
| WO | WO 2016/147832 A1 | 9/2016 |
| WO | WO 2017/195487 A1 | 11/2017 |

\* cited by examiner

FIG.14
| DISPLACEMENT OF SCAN TARGET OBJECT | WITH WFC | WITHOUT WFC |
|---|---|---|
| − | 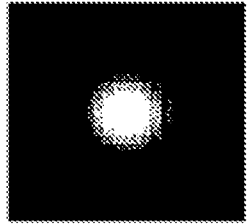 | 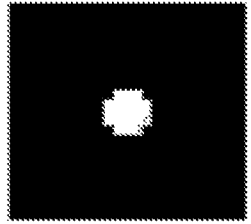 |
| 0 | 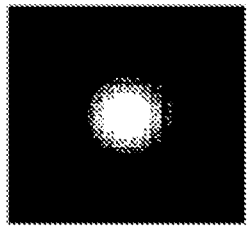 | 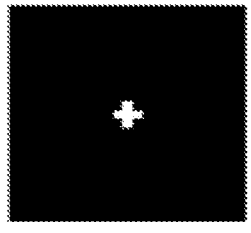 |
| + | 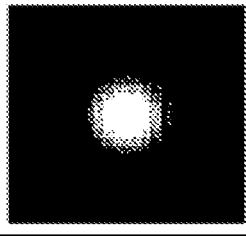 | 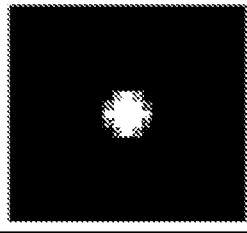 |

IMAGE READING DEVICE

TECHNICAL FIELD

The present disclosure relates to an image reading device that scans an image and performs blur correction on the scanned image.

BACKGROUND ART

Contact image sensor (CIS) technology is employed in image reading devices such as copiers and scanners. An image reading device with the CIS technology includes gradient index rod lenses and imaging elements arranged in a line. Light is scattered on a scan target object, passes through the gradient index lenses, and forms an image on the imaging elements. The image reading device is used for scanning various types of documents. When the document is a paper sheet, the whole document can be on a glass surface during scanning. When the document is a bound document, however, the bound area of the document is away from the glass surface during scanning. When gradient index lenses are used, the image reading device may fail to scan the scan target object at a sufficiently high resolution if the scan target object is partly away from the glass surface of the image reading device.

Because the refractive index varies with the wavelength of light, the light having passed through the lens has different focus positions corresponding to color components represented by red (R), green (G), and blue (B). Thus, when the document is positioned at the focus position of the G color component, for example, the position of the document is out of focus positions of the R and B color components, resulting in blurred images corresponding to the R and B color components. In other words, an image reading device employing a lens causes axial chromatic aberration, which is a phenomenon in which different wavelengths of light form images at different positions.

The image reading device disclosed in Patent Literature 1 scans beforehand patterns that represent concentrated ideal point light sources on a provided reference image, and calculates a point spread function (PSF) for each of R, G, and B. The image reading device corrects chromatic aberration by creating correction filters based on the calculated PSFs and applying the correction filters to the scanned image to correct for each of R, G, and B.

CITATION LIST

Patent Literature

Patent Literature 1: Unexamined Japanese Patent Application Kokai Publication No. H4-051672

SUMMARY OF INVENTION

Technical Problem

When the document is near a focus position in an image reading device employing a lens, chromatic aberration can be corrected by using the PSF measured in advance for each of R, G, and B, as disclosed in Patent Literature 1. However, when the document to be scanned is a bound document and the bound area is away from the focus position, chromatic aberration cannot be corrected by using the correction filters based on PSFs measured in advance for a document that is positioned at a focus position.

The present disclosure has been made in view of the foregoing circumstances, and an objective of the present disclosure is to correct chromatic aberration with improved accuracy.

Solution to Problem

To accomplish the aforementioned objective, the image reading device according to the present disclosure includes a light source, sensors, optical systems, a width detector, a displacement detector, a first blur corrector, an adjuster, and a combiner. The light source illuminates an illumination area with light. The sensors include imaging elements and generate, from images formed on the imaging elements, image data containing a component data piece for each of color components. The sensors are arranged in a line. The optical systems are provided for their corresponding sensors. The optical systems cause light to form images on the imaging elements included in the sensors, the light being emitted by the light sources and scattered on a scan target object in a scanning area in the illumination area. The optical systems are arranged along a main scanning direction that is a direction in which the sensors are arranged. The width detector detects a width of a duplicate area along the main scanning direction, the duplicate area being an area in which images indicated by the image data generated by adjoining sensors of the sensors overlap each other. The displacement detector detects, for each of the optical systems, a displacement of the scan target object along an optical axis relative to a focus position of the optical system based on the width of the duplicate area along the main scanning direction. The first blur corrector performs blur correction on each component data piece using a point spread function for each of the color components, the point spread function being dependent on the displacement of the scan target object. The adjuster adjusts, on the basis of a transfer magnification dependent on a displacement of the scan target object, a size of an image for each of the color components indicated by the component data piece. The combiner combine the images by superimposing portions of the component data pieces generated by adjoining sensors, having undergone blur correction by the first blur corrector, and adjusted by the adjuster.

Advantageous Effects of Invention

According to the present disclosure, chromatic aberration can be corrected with improved accuracy by performing blur correction on a component data piece contained in image data using a point spread function for each of color components, the point spread function being dependent on a displacement of the scan target object along the optical axis direction relative to a focus position.

BRIEF DESCRIPTION OF DRAWINGS

FIG. 14 illustrates an example of various PSFs;

DESCRIPTION OF EMBODIMENTS

An image reading device according to embodiments of the present disclosure will now be described in detail with reference to the drawings. Identical reference symbols are given to identical or equivalent parts throughout the drawings.

Embodiment 1

Figure 1:
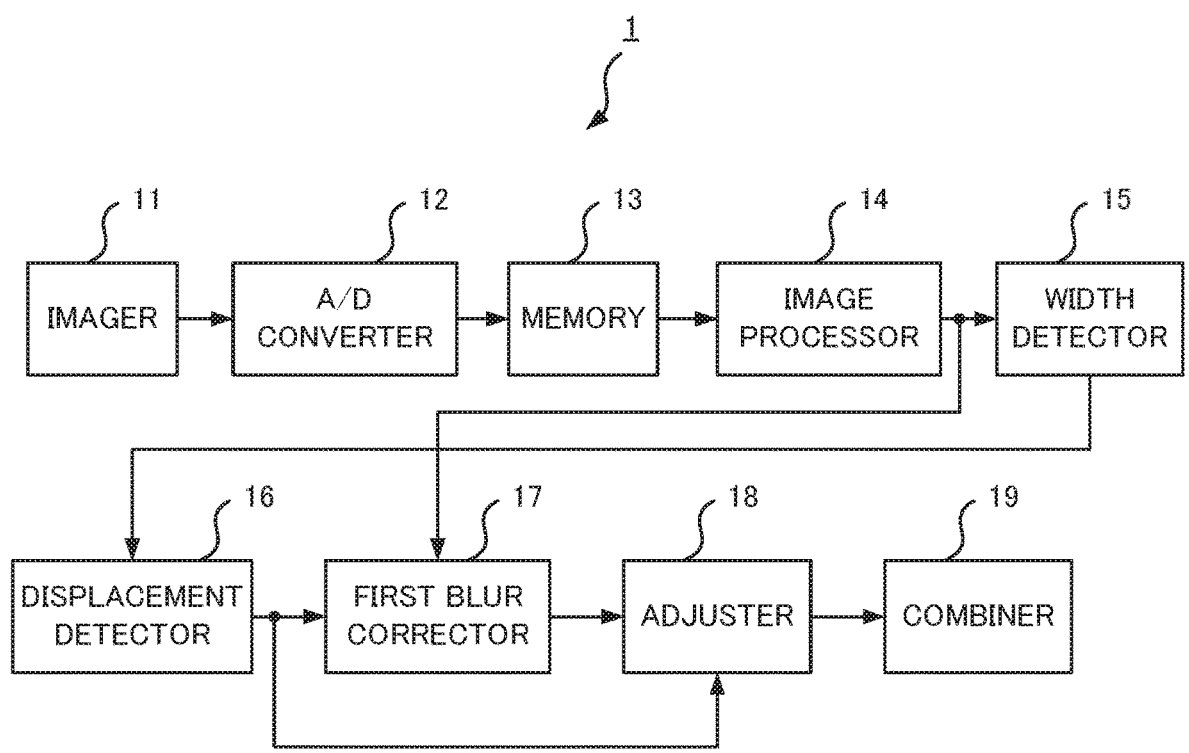
FIG. 1 is a block diagram illustrating an example configuration of an image reading device according to Embodiment 1 of the present disclosure.

As illustrated in FIG. 1, an image reading device 1 includes an imager 11 that scans a scan target object 2 to generate image data containing component data pieces regarding the red (R), green (G), and blue (B) color components, respectively. The image reading device 1 includes an analog-to-digital (A/D) converter 12 that carries out an A/D conversion on the image data generated by the imager 11, and a memory 13 that stores the A/D converted image data. The image reading device 1 further includes an image processor 14, a width detector 15, and a displacement detector 16. The image processor 14 performs image processing, such as inverting, on the image data stored in the memory 13. The width detector 15 detects a width of a duplicate area along the main scanning direction. The duplicate area is an area in which images indicated by the image data overlap each other. The displacement detector 16 detects, for each of optical systems 33, a displacement of the scan target object 2 along the optical axis relative to the focus position based on the width of the duplicate area along the main scanning direction. The image reading device 1 further includes a first blur corrector 17 that performs blur correction on each component data piece using a point spread function (PSF) for each of the color components, the PSF being dependent on a displacement of the scan target object 2, and an adjuster 18 that adjusts, based on a transfer magnification dependent on a displacement of the scan target object 2, the size of the image for each of the components indicated by the component data piece. For every two adjoining sensors 34, a combiner 19 combines the images by superimposing portions of component data pieces corresponding to the two adjoining sensors 34.

Figure 2:
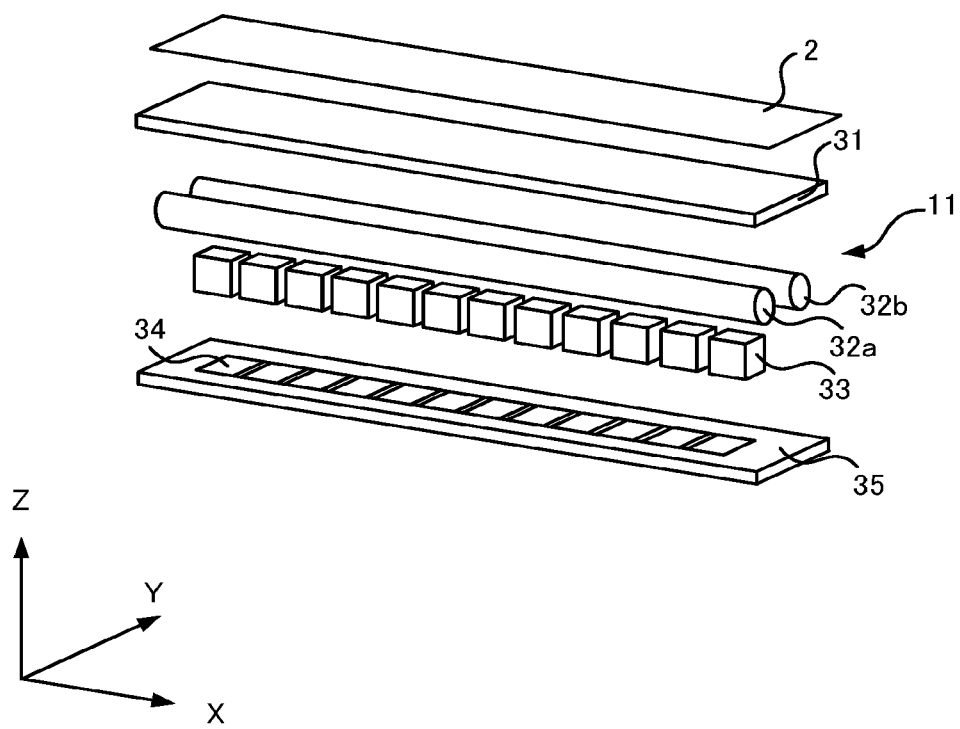
FIG. 2 is a perspective view of an imager according to Embodiment 1.

As illustrated in FIG. 2, the imager 11 includes a transparent body 31, light sources 32a and 32b that illuminate an illumination area with light, sensors 34 arranged in a line and having imaging elements described later, optical systems 33 provided for the corresponding sensors 34, and a board 35 on which the sensors 34 are placed. A cover glass is used as the transparent body 31. The main scanning direction is a direction in which the sensors 34 are arranged, and in the example in FIG. 2, the main scanning direction is parallel to the X-axis. The optical systems 33 are arranged along the main scanning direction. The direction in which the scan target object 2 is conveyed is a sub-scanning direction. The sub-scanning direction is orthogonal to the main scanning direction. The sub-scanning direction is parallel to the Y-axis in the example in FIG. 2. The optical axis direction of the optical system 33 is orthogonal to the main scanning direction and the sub-scanning direction. The optical axis direction is parallel to the Z-axis in the example in FIG. 2. For example, the Z-axis extends vertically.

The scan target object 2 is conveyed by a conveyance mechanism (not illustrated) on the vertically upper face of the transparent body 31 in the sub-scanning direction. Each of the light sources 32a and 32b includes a light emitting diode (LED) light source and a light guide. Light emitted by the light sources 32a and 32b is scattered on a surface of the scan target object 2 in the scanning area of the optical system 33 in the illumination area of the light sources 32a and 32b. The optical system 33 causes the scattered light to form an image on imaging elements included in the sensor 34. The sensor 34 is a one-dimensional image sensor, and examples of the sensor 34 include a complementary metal-oxide-semiconductor (CMOS) sensor, a charge-coupled device (CCD) sensor, and the like. From images formed on the imaging elements, the sensor 34 generates image data containing a component data piece for each of the color components.

Figure 3:
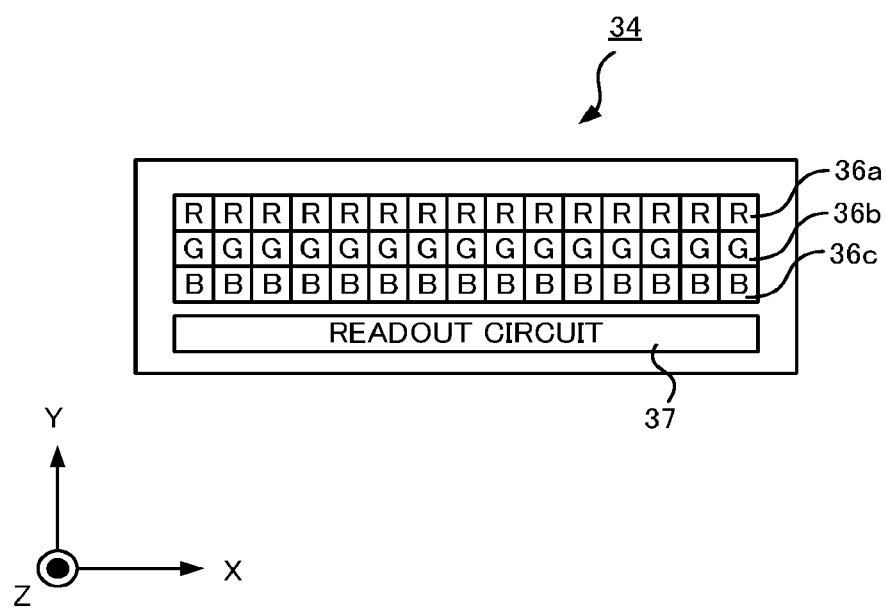
FIG. 3 illustrates an example configuration of a sensor according to Embodiment 1.

As illustrated in FIG. 3, each sensor 34 includes imaging elements 36a, 36b, and 36c that carry out photoelectric conversion, and also includes a readout circuit 37 that reads electric signals output by the imaging elements 36a, 36b, and 36c and outputs the signals as image data. As described above, the optical system 33 causes the light scattered on the surface of the scan target object 2 to form images on the imaging elements 36a, 36b, and 36c. A red optical filter is placed on the optical system 33 side of the imaging element 36a to convert red light into electric signals. A green optical filter is placed on the optical system 33 side of the imaging element 36b to convert green light into electric signals. A blue optical filter is placed on the optical system 33 side of the imaging element 36c to convert blue light into electric signals. In the description below, the imaging element 36 represents any of the imaging elements 36a, 36b, and 36c.

Figure 4:
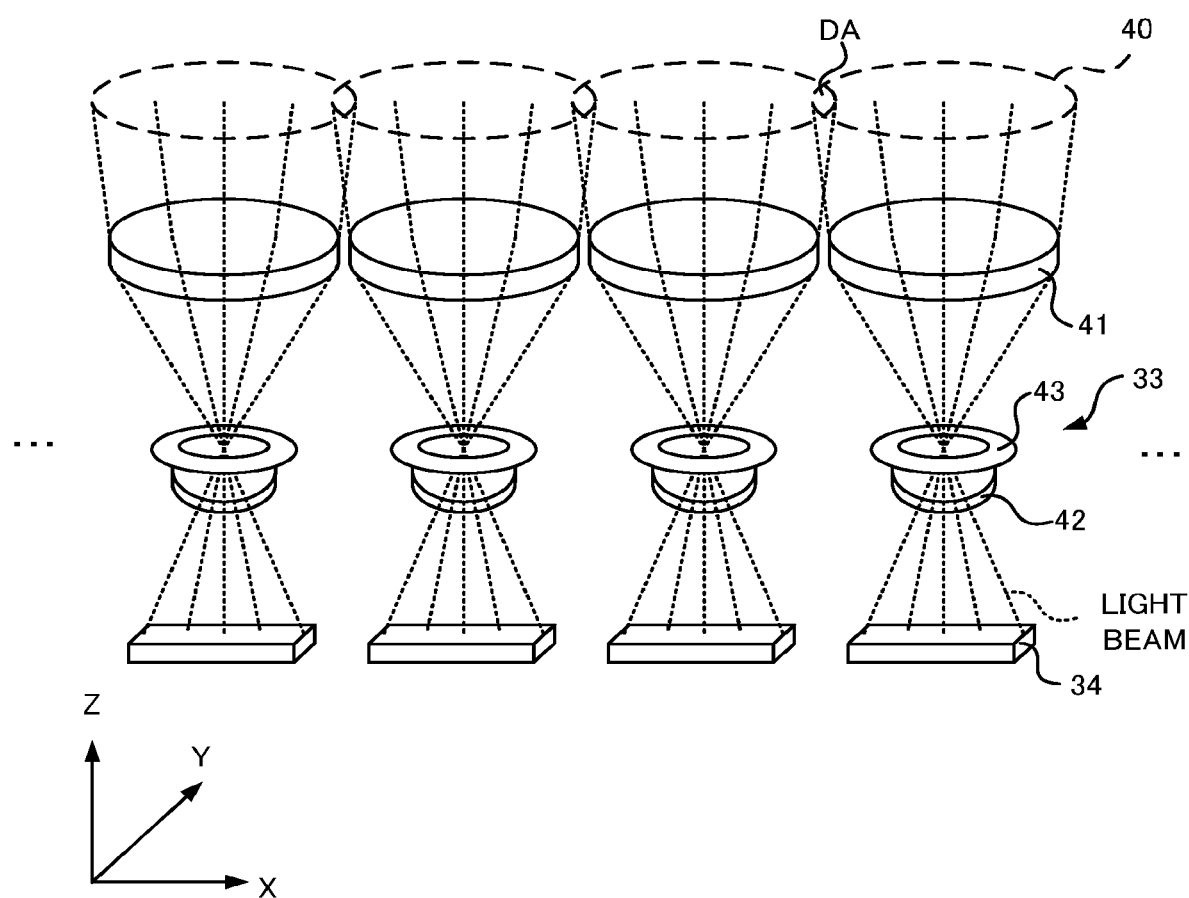
FIG. 4 is a perspective view of optical systems according to Embodiment 1.

The imager 11 may include any number of optical systems 33 and sensors 34. As illustrated in FIG. 4, the optical system 33 has a combination lens including a first lens 41 and a second lens 42, and also has an aperture 43 disposed between the first lens 41 and the second lens 42 along the optical axis direction. The second lens 42 is positioned closer to the sensor 34 than the first lens 41. A dotted line in FIG. 4 represents a light beam. A broken line in FIG. 4 represents a scanning area 40. The light emitted by the light sources 32a and 32b is scattered on a surface of the scan target object 2 in the scanning area 40. The scattered light is converged by the first lens 41 and passes through the aperture 43. The light passing through the aperture 43 results in an image formed on the sensor 34 by the second lens 42. The sensor 34 is disposed at a position where an image is formed by the optical system 33. The optical system 33 is a non-telecentric optical system. Scanning areas 40 of adjoining optical systems 33 overlap each other.

Figure 5:
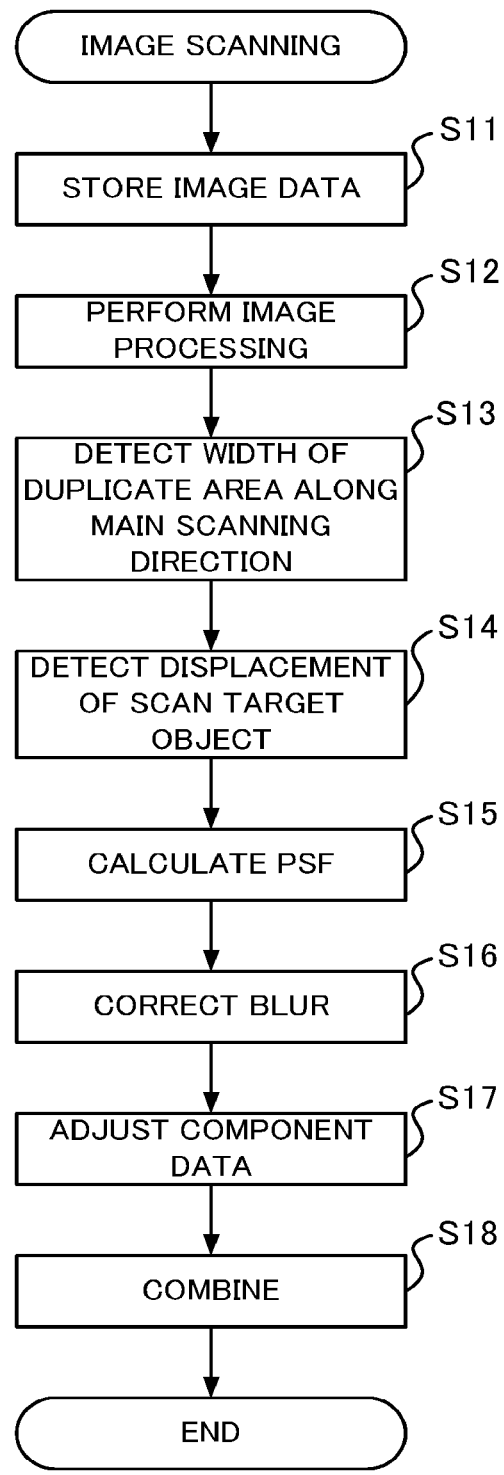
FIG. 5 is a flowchart illustrating an example image scanning process performed by the image reading device according to Embodiment 1.

Referring to FIG. 5, the following describes an outline of the processing performed by the image reading device 1 on the basis of image data generated by the imager 11 configured as above. The image data generated by the imager 11 and A/D converted in the A/D converter 12 is stored in the memory 13 on a line-by-line basis (step S11). The image processor 14 performs image processing, such as inverting, on the image data (step S12). The width detector 15 detects the width of an overlap area between scanning areas, that is, the width of a duplicate area along the main scanning direction, as described later (step S13). Based on the width of the duplicate area along the main scanning direction as detected in step S13, the displacement detector 16 detects, for each of the optical systems 33, a displacement of the scan target object 2 along the optical axis direction relative to the focus position (step S14). According to the displacement of the scan target object 2 along the optical axis direction relative to the focus position, the first blur corrector 17 calculates a PSF for each of the color components (step S15). The first blur corrector 17 performs blur correction on the component data pieces using the calculated PSFs (step S16). The adjuster 18 adjusts the component data pieces on the basis of the transfer magnification that is dependent on the displacement of the scan target object 2 along the optical axis direction relative to the focus position (step S17). The combiner 19 combines the images by superimposing portions of the component data pieces (step S18).

As described above, the width detector 15 detects the width of the duplicate area along the main scanning direction. On the basis of the width of the duplicate area along the main scanning direction detected by the width detector 15, the displacement detector 16 detects, for each of the optical systems 33, a displacement of the scan target object 2 along the optical axis direction relative to the focus position. The following describes how a displacement of the scan target object 2 along the optical axis direction can be detected on the basis of the width of the duplicate area along the main scanning direction.

Figure 6:
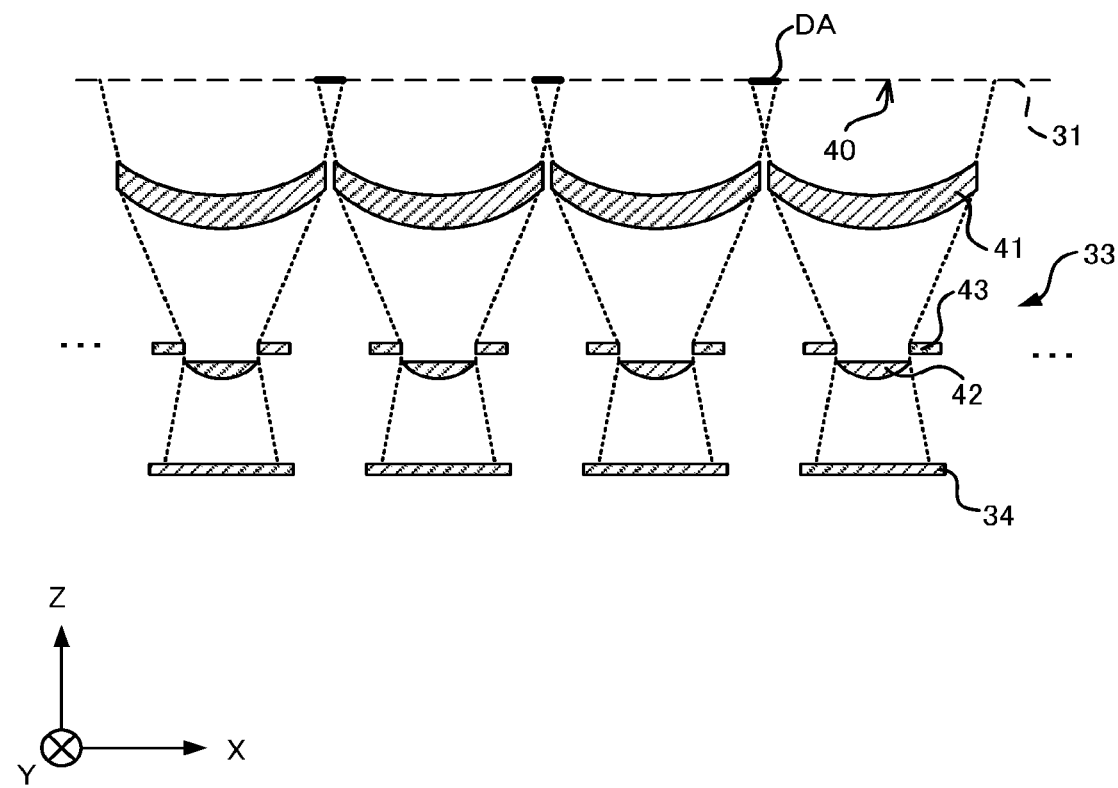
FIG. 6 is a cross-sectional view of the optical systems according to Embodiment 1.

First of all, referring to FIG. 6, the following describes that scanning areas 40 of adjoining optical systems 33 overlap each other. FIG. 6 is a cross-sectional view of the optical systems 33 in FIG. 4 on an XZ plane. In FIG. 6, the scan target object 2 is on a glass surface 31 indicated by a broken line. In FIG. 6, a thick solid line indicates an overlap area between scanning areas 40, namely a duplicate area DA. As an example, it is assumed that thirty-two optical systems 33 and thirty-two sensors 34 are arranged along the main scanning direction and adjoining optical systems 33 and adjoining sensors 34 are all placed at intervals of 9 mm. If the width of the scanning area 40 along the main scanning direction is 10 mm, adjoining scanning areas 40 overlap each other by 1 mm along the main scanning direction. In other words, the duplicate area DA has a width of 1 mm. Since the scanning areas 40 overlap each other by 1 mm along the main scanning direction, the combiner 19 superimposes portions of images indicated by the image data generated by the sensors 34, and generates a single composite image, as described later.

Figure 7:
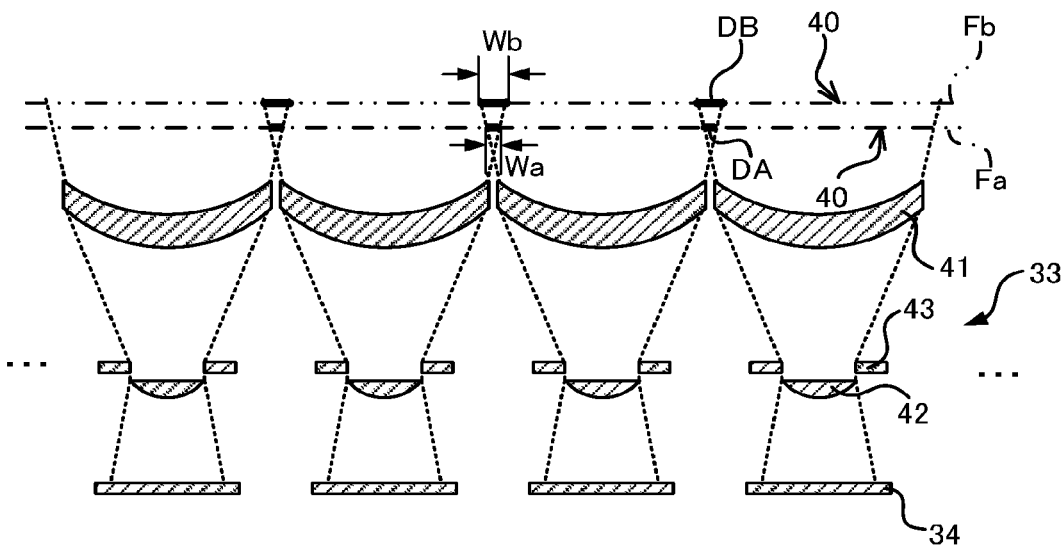
FIG. 7 illustrates a change in scanning area in Embodiment 1.

Referring to FIG. 7, the following describes that the scanning area varies with a displacement of the scan target object 2 along the optical axis direction relative to the focus position. A displacement of the scan target object 2 along the optical axis direction occurs when, for example, a bound document is scanned. Specifically, the bound area of the document is not pressed against the glass surface 31 but lifted up. The scanning area 40 varies because part of the document is raised from the glass surface 31. FIG. 7 is a cross-sectional view of the optical systems 33 in FIG. 4 on an XZ plane. The example in FIG. 7 illustrates scanning areas 40 with the scan target object 2 placed at a position Fa indicated by a dashed-dotted line and at a position Fb indicated by a two-dot chain line. Note that the position Fa coincides with the position of the glass surface 31. In FIG. 7, scanning areas 40 overlap each other by an amount indicated by a thick solid line.

The width of the duplicate area DA along the main scanning direction corresponding to the scan target object 2 at the position Fa is denoted as Wa. The width of a duplicate area DB along the main scanning direction corresponding to the scan target object 2 at the position Fb is denoted as Wb. The focus position of the optical system 33 is assumed to be at the position Fa. As the scan target object 2 is more distant from the optical system 33 than the focus position, the duplicate area has a greater width along the main scanning direction, and thus Wb is greater than Wa. By contrast, as the scan target object 2 is closer to the optical system 33 than the focus position, the duplicate area has a smaller width along the main scanning direction. In other words, the width of the duplicate area along the main scanning direction varies with the position of the scan target object 2. Therefore, the displacement detector 16 is capable of detecting a displacement of the scan target object 2 along the optical axis direction relative to the focus position of the optical system 33 on the basis of the width of the duplicate area along the main scanning direction.

Figure 8:
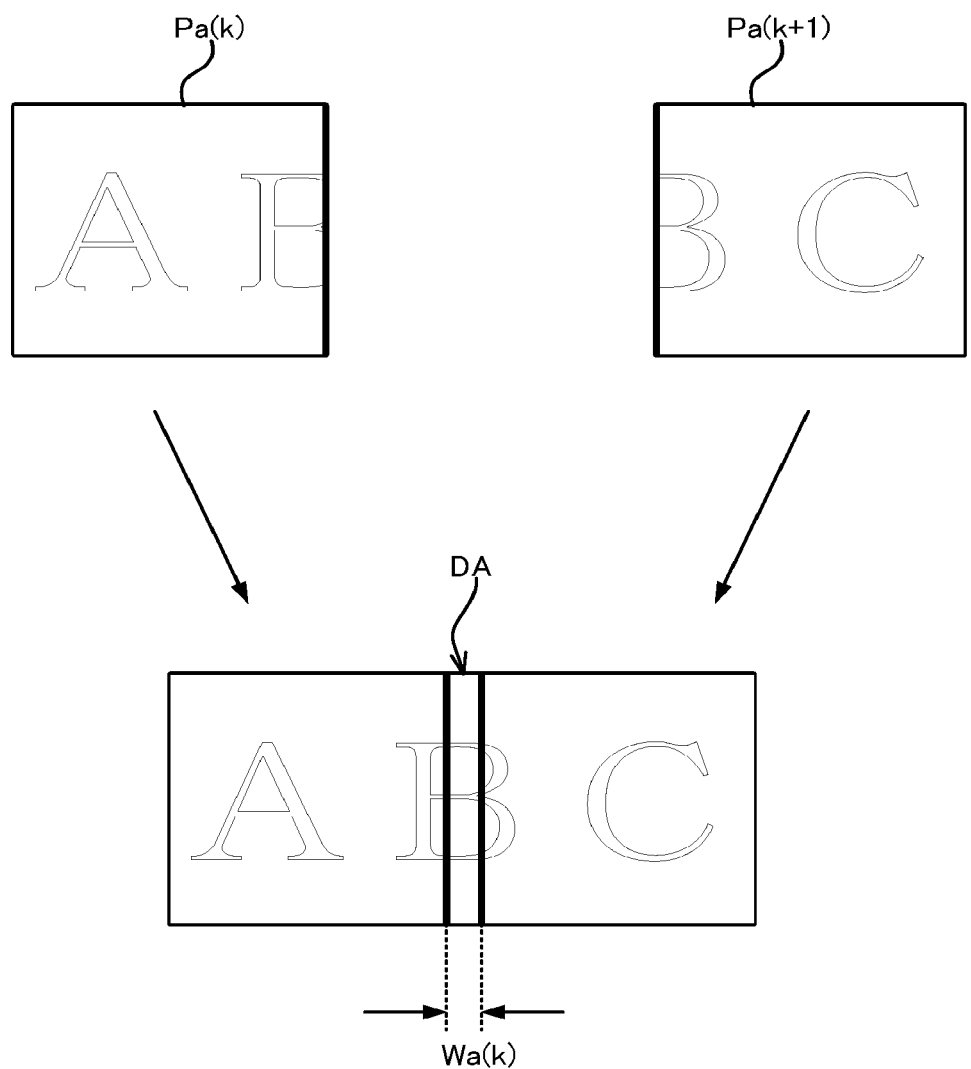
FIG. 8 illustrates an example of matching processing in Embodiment 1.

The following describes a matching process performed by the width detector 15 for the purpose of detecting the duplicate area. In the example taken in the description below, the image reading device 1 includes n sensors 34, where n is the number of sensors 34. With the scan target object 2 positioned at the position Fa indicated in FIG. 7, an image data piece output by the k-th sensor 34 ($1 \leq k \leq n$) in an array of sensors 34 arranged in the positive X-axis direction is denoted as Pa (k), and an image data piece output by the (k+1)-th sensor 34 is denoted as Pa (k+1). As illustrated in FIG. 8, the same image is included in the image indicated by Pa (k) in its rightmost area and in the image indicated by Pa (k+1) in its leftmost area. In other words, the image indicated by Pa (k) and the image indicated by Pa (k+1) overlap each other. The width detector 15 performs a matching process for detecting the duplicate area between images indicated by Pa (k) and Pa (k+1) by using, for example, the method described in International Publication No. WO 2016/147832. After detecting the duplicate area by performing the matching process, the width detector 15 detects the width Wa(k) of the duplicate area along the main scanning direction. The width detector 15 performs the above-described process sequentially from k=1 to k=n−1.

Figure 9:
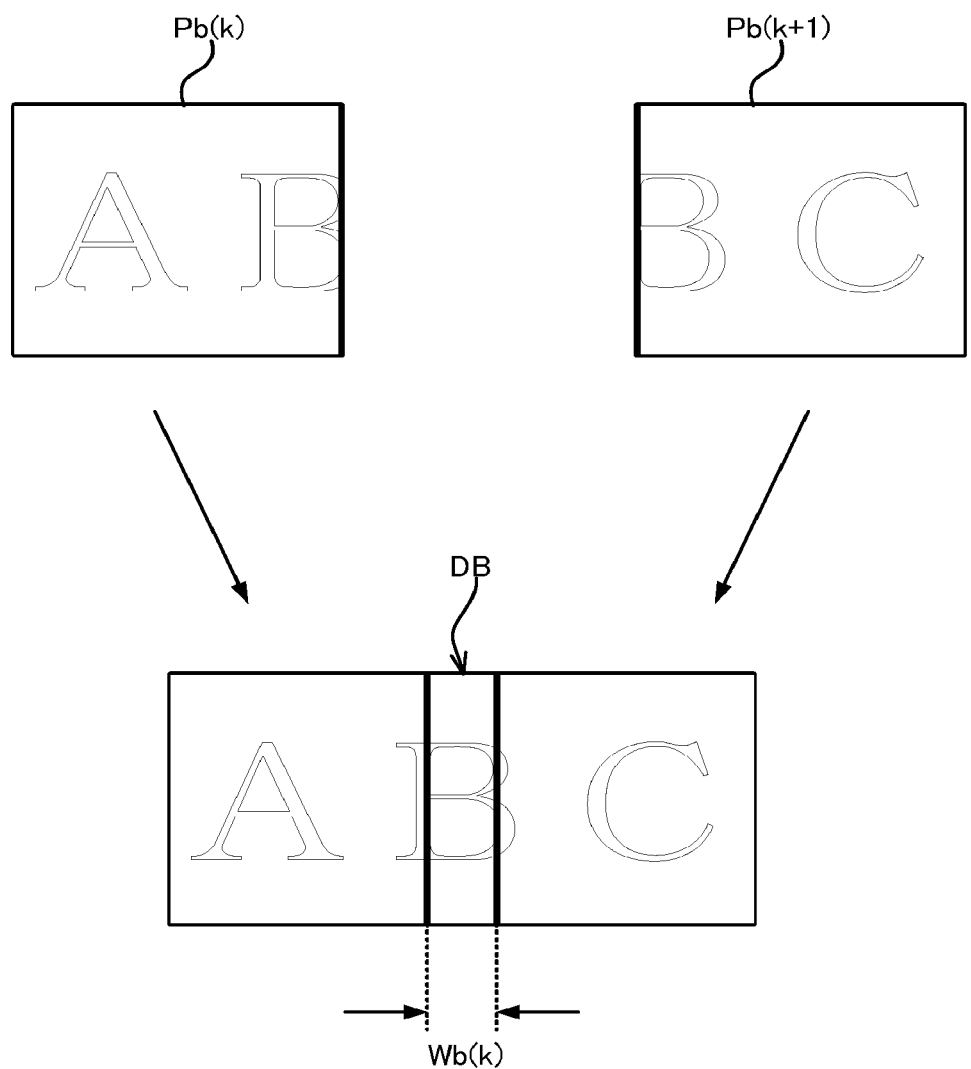
FIG. 9 illustrates an example of matching processing in Embodiment 1.

With the scan target object 2 positioned at the position Fb indicated in FIG. 7, the image data piece output by the k-th sensor 34 is denoted as Pb(k), and the image data piece output by the (k+1)-th sensor 34 is denoted as Pb(k+1). As illustrated in FIG. 9, the same image is included in the image indicated by Pb(k) in its rightmost area and in the image indicated by Pb(k+1) in its leftmost area. In other words, the image indicated by Pb(k) and the image indicated by Pb(k+1) overlap each other. The width detector 15 detects the duplicate area and its width Wb(k) along the main scanning direction between the images indicated by Pb(k) and Pb(k+1) in a manner similar to that in the example described above. The width detector 15 performs the above-described process sequentially from k=1 to k=n−1. The position Fb is more distant from the optical system 33 than the focus position, and thus Wb(k) is greater than Wa(k) as seen in FIGS. 8 and 9.

Figure 10:
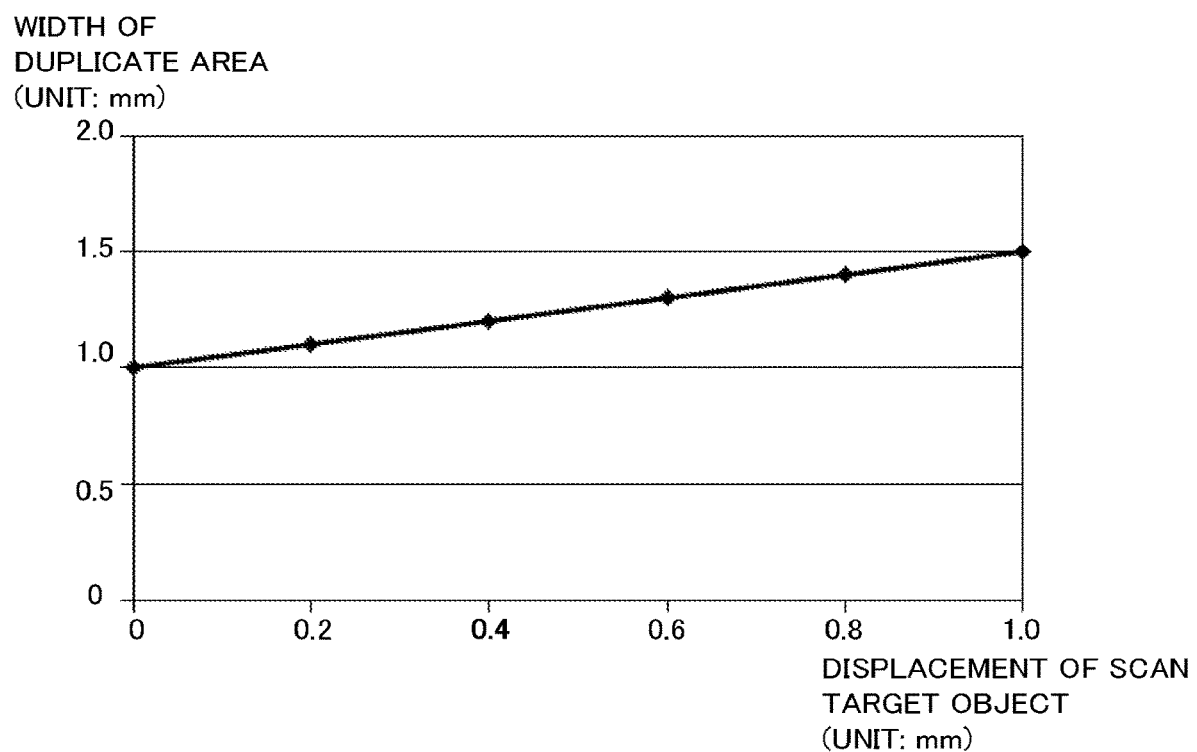
FIG. 10 illustrates an example relationship between a displacement of the scan target object and a width of a duplicate area in Embodiment 1.

The displacement detector 16 detects, for each of the optical systems 33, a displacement of the scan target object 2 along the optical axis direction relative to the focus position on the basis of the width of the duplicate area along the main scanning direction as detected by the width detector 15. Note that this focus position refers to the focus position for the G component and is positioned at the glass surface 31. FIG. 10 illustrates an example relationship between a displacement of the scan target object 2 along the optical axis direction relative to the focus position of the optical system 33 and a width of the duplicate area along the main scanning direction. As illustrated in FIG. 10, there is a linear relationship between a displacement of the scan target object 2 and a width of the duplicate area along the main scanning direction. Based on the width of the duplicate area along the main scanning direction as detected by the width detector 15, the displacement detector 16 detects a displacement of the scan target object 2 along the optical axis direction relative to the focus position by using the relationship illustrated in FIG. 10.

The following describes a process performed by the displacement detector 16. As with the above example, the image data pieces output by the k-th, the (k+1)-th, and the (k+2)-th sensors 34 are denoted as P(k), P(k+1), and P(k+2), respectively. The width of the duplicate area along the main scanning direction between the images indicated by P(k) and P(k+1) is denoted as W(k). The width of the duplicate area along the main scanning direction between the images indicated by P(k+1) and P(k+2) is denoted as W(k+1). The displacement detector 16 designates as W(k) the width of the duplicate area along the main scanning direction corresponding to the k-th cell, and designates as W(k+1) the width of the duplicate area along the main scanning direction corresponding to the (k+1)-th cell. Then, from the relationship illustrated in FIG. 10, the displacement detector 16 calculates D(k) and D(k+1) on the basis of W(k) and W(k+1), respectively, where D(k) is a displacement of the scan target object 2 along the optical axis direction relative to the focus position of the k-th optical system 33, and D(k+1) is a displacement of the scan target object 2 along the optical axis direction relative to the focus position of the (k+1)-th optical system 33.

Figure 11:
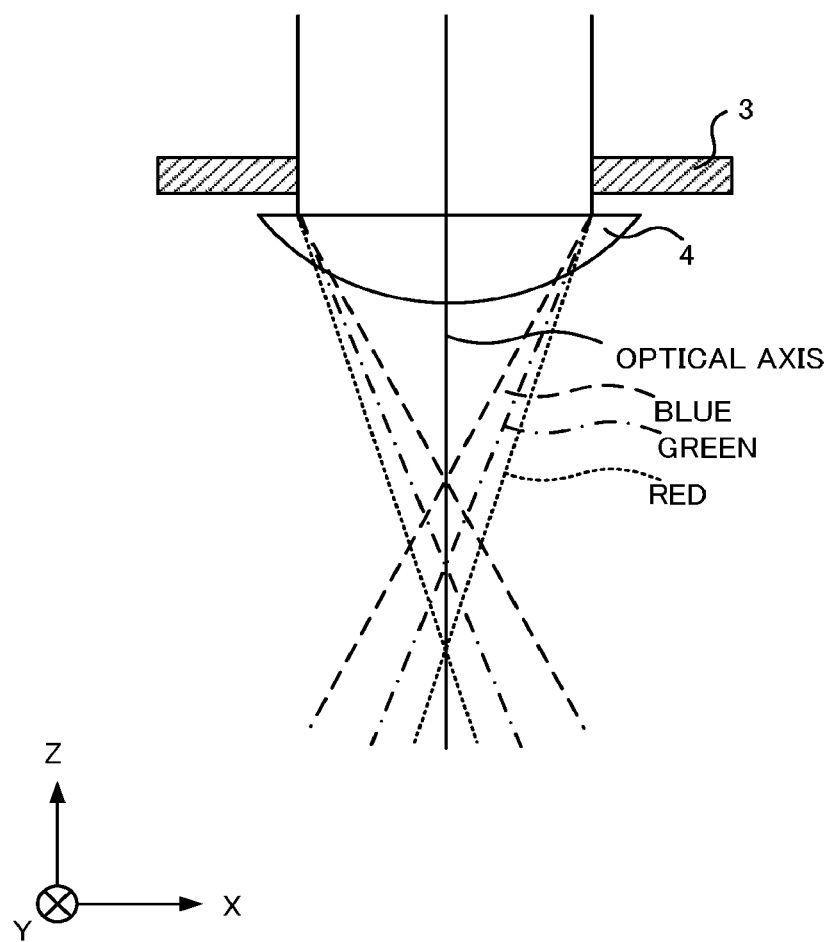
FIG. 11 illustrates an example of axial chromatic aberration.

The first blur corrector 17 calculates a PSF for each of the color components on the basis of the displacement detected by the displacement detector 16. Then, the first blur corrector 17 performs blur correction on the component data pieces using the calculated PSFs. The following describes reasons for performing the blur correction using PSFs for their corresponding color components. An image reading device employing a lens causes axial chromatic aberration, which is a phenomenon in which different wavelengths of light form images at different positions. In an example described below, light passes through the aperture 3 and enters the refractive lens 4. FIG. 11 illustrates an example in which the light that includes the R, G, and B color components and is parallel to the optical axis enters the refractive lens 4. In the example in FIG. 11, a blue light beam is indicated by a broken line, a green light beam is indicated by a dashed-dotted line, and a red light beam is indicated by a dotted line. Because the refractive index of the refractive lens 4 varies with the wavelength of light, axial chromatic aberration, which is a phenomenon in which the focus position varies among the R, G, and B color components, occurs as illustrated in FIG. 11. Specifically, as illustrated in FIG. 11, blue light beams form an image at a position closer to the refractive lens 4 than green light beams. Red light beams form an image at a position more distant from the refractive lens 4 than green light beams.

Figure 12:
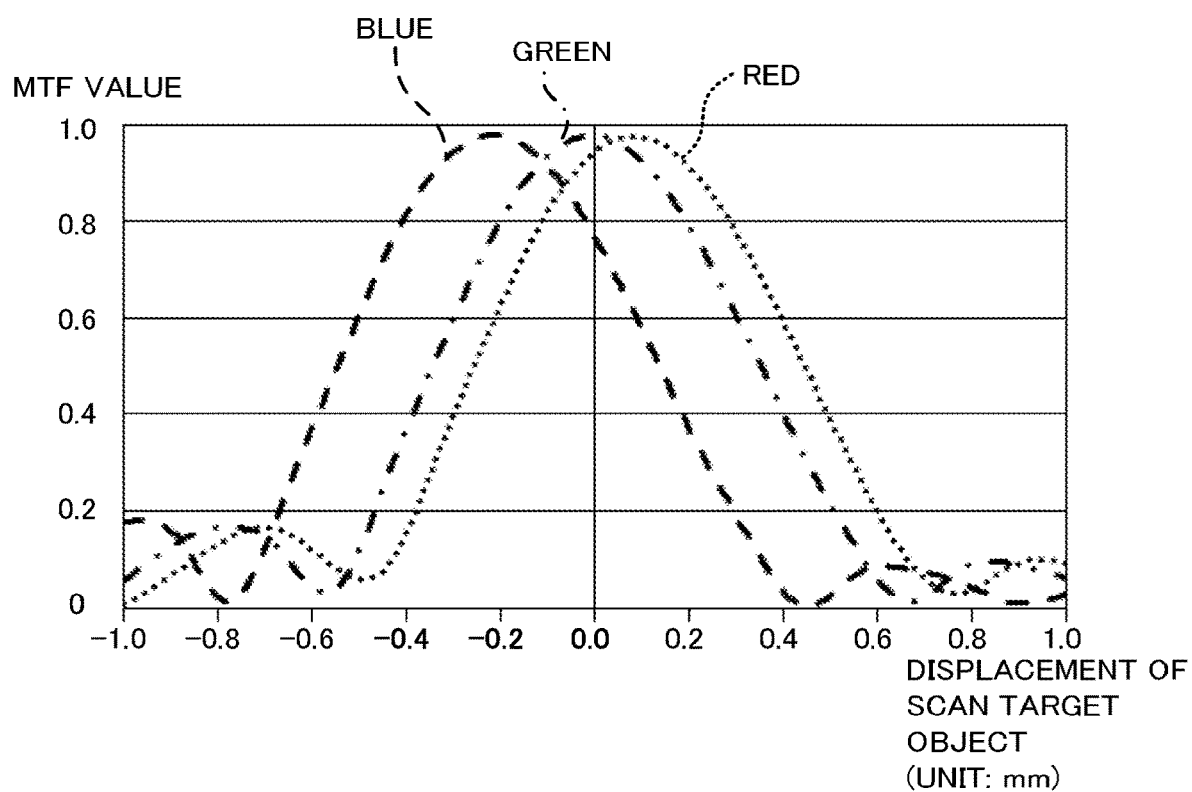
FIG. 12 illustrates an example relationship between a displacement of the scan target object and an MTF value.

FIG. 12 illustrates an example relationship between a displacement of the scan target object 2 and a modulation transfer function (MTF) value. In FIG. 12, the horizontal axis represents a displacement of the scan target object 2 (in mm) relative to the focus position of the refractive lens 4. That is, when the scan target object 2 is at the focus position, the displacement of the scan target object 2 has a value of 0. When the scan target object 2 is more distant from the refractive lens 4 than the focus position, the displacement of the scan target object 2 has a positive value. When the scan target object 2 is closer to the refractive lens 4 than the focus position, the displacement of the scan target object 2 has a negative value. The vertical axis represents an MTF value corresponding to a spatial frequency of 380 dpi. FIG. 12 shows MTF values for the R, G, and B color components. In the example in FIG. 12, a blue light beam is indicated by a broken line, a green light beam is indicated by a dashed-dotted line, and a red light beam is indicated by a dotted line. A red light beam, which has the longest wavelength among the R, G, and B color components, is at the peak MTF value when the scan target object 2 is more distant from the refractive lens 4 than the focus position. By contrast, a blue light beam, which has the shortest wavelength among the R, G, and B color components, is at the peak MTF value when the scan target object 2 is closer to the refractive lens 4 than the focus position. Thus, when the scan target object 2 is more distant from the refractive lens 4 than the focus position, red light beams form an image without blurs while blue light beams form a blurred image, resulting in a reddish black-and-white image. When the scan target object 2 is closer to the refractive lens 4 than the focus position, blue light beams form an image without blurs while red light beams form a blurred image, resulting in a bluish black-and-white image.

Axial chromatic aberration also occurs on the optical system 33 according to Embodiment 1. Hence, the first blur corrector 17 performs blur correction on the component data pieces using PSFs for their corresponding color components, the PSFs being dependent on a displacement of the scan target object 2. Letting y be image data generated by the sensor 34, x be an actual image, and h be a PSF distribution, y is expressed by the equation (1) below. In the equation (1) below, * represents a convolution integral. Fourier transform of the equation (1) below gives the equation (2) below. Inverse transform of the equation (2) below gives the equation (3) below. Blur correction can be made by performing a process expressed by the equation (3) below. Example methods for performing the process of the following equation (3) include using the Wiener filter.

$$y = x * h \quad (1)$$

$$Y = X \times H \quad (2)$$

$$X = Y \times H^{-1} \quad (3)$$

As described above, the first blur corrector 17 performs blur correction on the component data pieces using PSFs for their corresponding color components, the PSFs being dependent on a displacement of the scan target object 2. The PSFs, which are obtained from images formed by the light incoming from the point light source disposed at the focus position, are measured in advance for the corresponding color components. A PSF dependent on a displacement of the scan target object 2 can be calculated for each of the color components on the basis of the PSFs measured in advance for the corresponding color components. For example, the PSFs obtained from images formed by the light incoming from the point light sources disposed at the focus position of the optical system 33 and at both ends of the depth of field of the optical system 33 are calculated in advance for the corresponding color components through simulation or actual measurement. A PSF dependent on a displacement of the scan target object 2 can be calculated by interpolation for each of the color components on the basis of the PSFs calculated in advance with respect to the focus position of the optical system 33 and to both ends of the depth of field of the optical system 33 for the corresponding color components. The first blur corrector 17 can correct the above-described axial chromatic aberration by using the PSFs for their corresponding color components, the PSFs being dependent on a displacement of the scan target object 2.

As illustrated in FIG. 7, the scanning area 40 of the optical system 33 varies in size with the position of the scan target object 2, and thus the transfer magnification also varies with the position of the scan target object 2. In other words, unless the transfer magnification that varies with the position of the scan target object 2 is corrected, images indicated by the image data provided by the individual sensors 34 are different in size, with the result that image data pieces cannot be combined properly. The adjuster 18 adjusts the size of the image for each of the color components indicated by the component data piece on the basis of the transfer magnification dependent on a displacement of the scan target object 2 detected by the displacement detector 16. The adjuster 18 adjusts the component data piece by enlarging or reducing the image for each of the color components indicated by the component data piece by a magnification, which is the reciprocal of the transfer magnification. The adjuster 18 uses an image enlarging/reducing technique such as bilinear interpolation or bicubic interpolation. In the example in FIG. 1, the adjuster 18 adjusts the size of the image for each of the color components indicated by the component data piece having undergone blur correction performed by the first blur corrector 17. In this case, the adjuster 18 adjusts the size of the image for each of the color components indicated by the component data piece after the first blur corrector 17 performs blur correction. Thus, the first blur corrector 17 uses the same size filter, whereby the processing can be simplified.

The combiner 19 obtains a composite image by superimposing portions of the component data pieces that have been generated by adjoining sensors 34, have undergone image processing by the image processor 14, have undergone blur correction by the first blur corrector 17, and have been adjusted by the adjuster 18. The combiner 19 obtains the composite image by taking weighted averages of the individual pixels in portions of the component data pieces. Portions of component data pieces refer to the component data pieces that indicate images corresponding to the duplicate areas DA and DB. Since the images indicated by the component data pieces for the respective color components have been adjusted to have a consistent size by the adjuster 18, the combiner 19 need only combine images by superimposing portions of the component data pieces by a predetermined length along the main scanning direction. Specifically, the combiner 19 combines images by superimposing the component data pieces that have been generated by two sensors 34, have undergone image processing by the image processor 14, have undergone blur correction by the first blur corrector 17, and have been adjusted by the adjuster 18.

The image reading device 1 repeats the above-described process while the scan target object 2 is conveyed in the sub-scanning direction, thereby providing a two-dimensional composite image. The image reading device 1 performs blur correction using PSFs for their corresponding color components, the PSFs being dependent on a displacement of the scan target object 2 along the optical axis direction relative to the focus position, thereby providing a composite image with axial chromatic aberration corrected.

(Variations)

As described above, the image reading device 1 according to Embodiment 1 corrects axial chromatic aberration by performing blur correction on component data pieces using PSFs for their corresponding color components, the PSFs being dependent on a displacement of the scan target object 2. In addition to axial chromatic aberration, the image reading device 1 may cause transverse chromatic aberration, which is a phenomenon in which an image is formed at a position shifted in a direction orthogonal to the optical axis. In the case of occurrence of the transverse chromatic aberration, the width of the duplicate area along the main scanning direction varies among the R, G, and B color components. To correct the transverse chromatic aberration, the image reading device 1 according to a variation of Embodiment 1 performs, for each of the color components, the processing handled by the width detector 15, the displacement detector 16, and the adjuster 18. Specifically, for each of the color components, the width detector 15 detects the width of the duplicate area, along the main scanning direction, of images indicated by the component data pieces generated by adjoining sensors 34. The displacement detector 16 detects, for each of the color components and each of the optical systems 33, a displacement of the scan target object 2 along the optical axis direction relative to the focus position of the color component of the optical system 33 on the basis of the width of the duplicate area along the main scanning direction, the width being detected for each of the color components. On the basis of a displacement of the scan target object 2 detected for each of the color components, the first blur corrector 17 performs, as described above, blur correction on the component data pieces using PSFs for their corresponding color components, the PSFs being dependent on a displacement of the scan target object 2. Then the adjuster 18 adjusts the size of the image for each of the color components indicated by the component data piece on the basis of the transfer magnification that is dependent on a displacement of the scan target object 2 detected for each of the color components.

As seen in the foregoing variation, the processing handled by the width detector 15, the displacement detector 16, and the adjuster 18 is performed for each of the color components, whereby a composite image in which the transverse chromatic aberration is corrected can be obtained. In other words, chromatic aberration can be corrected with improved accuracy.

As described above, the image reading device 1 according to Embodiment 1 achieves correction of chromatic aberration with improved accuracy by performing blur correction on component data pieces contained in image data, by using PSFs for their corresponding color components, the PSFs being dependent on a displacement of the scan target object 2.

Embodiment 2

Figure 13:
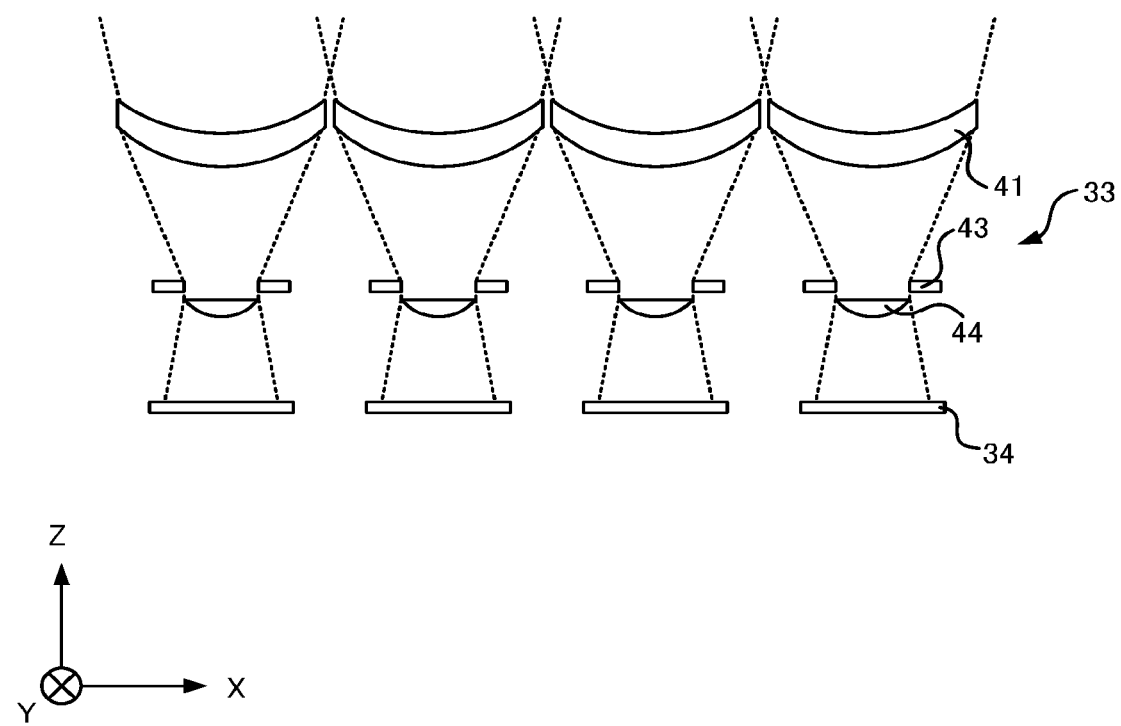
FIG. 13 is a cross-sectional view of optical systems according to Embodiment 2 of the present disclosure.

A technology called Wavefront Coding (WFC) has been developed for the purpose of extending a depth of field. WFC includes modulating a phase of transmitted light using a phase modulating element and restoring phase-modulated image data. The image reading device 1 according to Embodiment 2 includes an optical system that has a phase modulating lens. Configuration of the image reading device 1 according to Embodiment 2 is similar to that of the image reading device 1 according to Embodiment 1. As illustrated in FIG. 13, the optical system 33 in Embodiment 2 includes a second lens 44 in place of the second lens 42 included in the optical system 33 in Embodiment 1. The second lens 44 modulates a phase of the light entering the second lens 44.

As illustrated in FIG. 14, when WFC is applied, contours of PSF shapes uniformly blur with or without any displacement of the scan target object 2. By contrast, if WFC is not applied, contours of PSF shapes blur when the scan target object 2 is shifted from the focus position in any direction.

Figure 15:
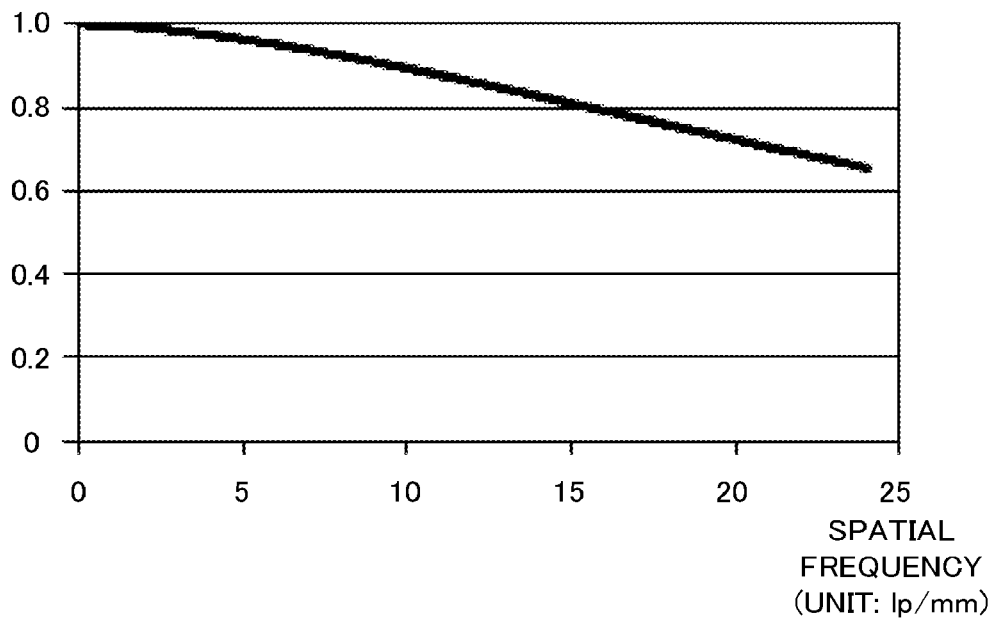
FIG. 15 illustrates an example relationship between a spatial frequency and an MTF value.
Figure 16:
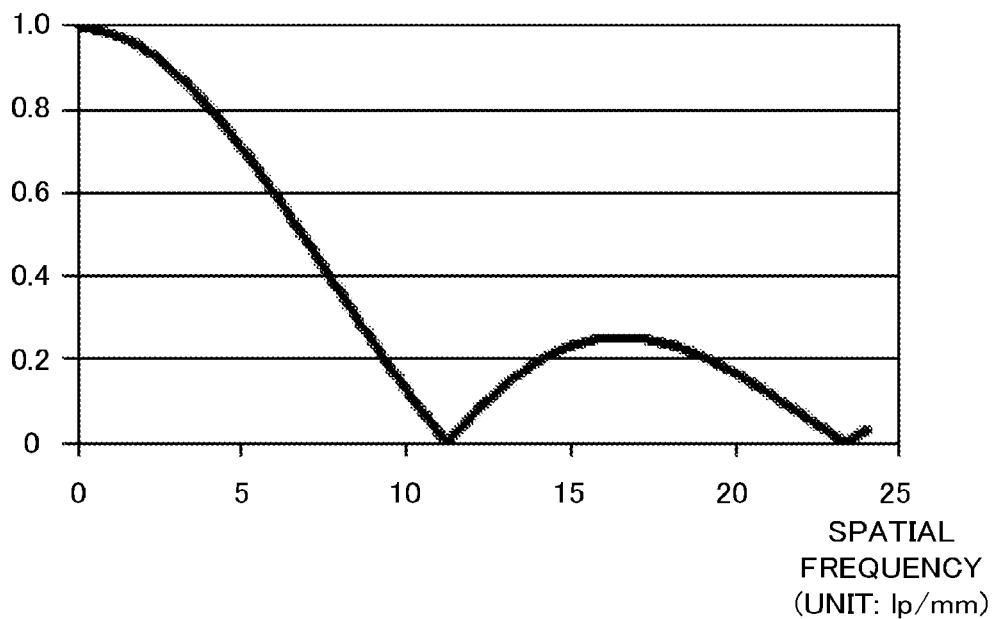
FIG. 16 illustrates an example relationship between a spatial frequency and an MTF value.

The MTF value varies when WFC is applied and differs depending on whether WFC is applied or not. The following demonstrates this difference, beginning with a description of MTF values without WFC. FIGS. 15 and 16 each illustrate a relationship between a spatial frequency and an MTF value with WFC not applied. In FIGS. 15 and 16, the horizontal axis represents a spatial frequency (in lp/mm) and the vertical axis represents an MTF value. More particularly, FIG. 15 illustrates an example relationship between a spatial frequency and an MTF value in the case where the scan target object 2 is at the focus position. FIG. 16 illustrates an example relationship between a spatial frequency and an MTF value in the case where the scan target object 2 is shifted from the focus position. It is seen that sufficiently high MTF values are obtained in a range of spatial frequencies shown in FIG. 15 when WFC is not applied and the scan target object 2 is at the focus position. On the other hand, the MTF value drops to 0 at a certain spatial frequency when WFC is not applied and the scan target object 2 is shifted from the focus position. The MTF value of 0 means loss of the image data at some spatial frequencies. In other words, when the MTF value is 0, the image is so blurred that blur correction cannot restore the image and the resulting image does not have a sufficiently high resolution.

Figure 17:
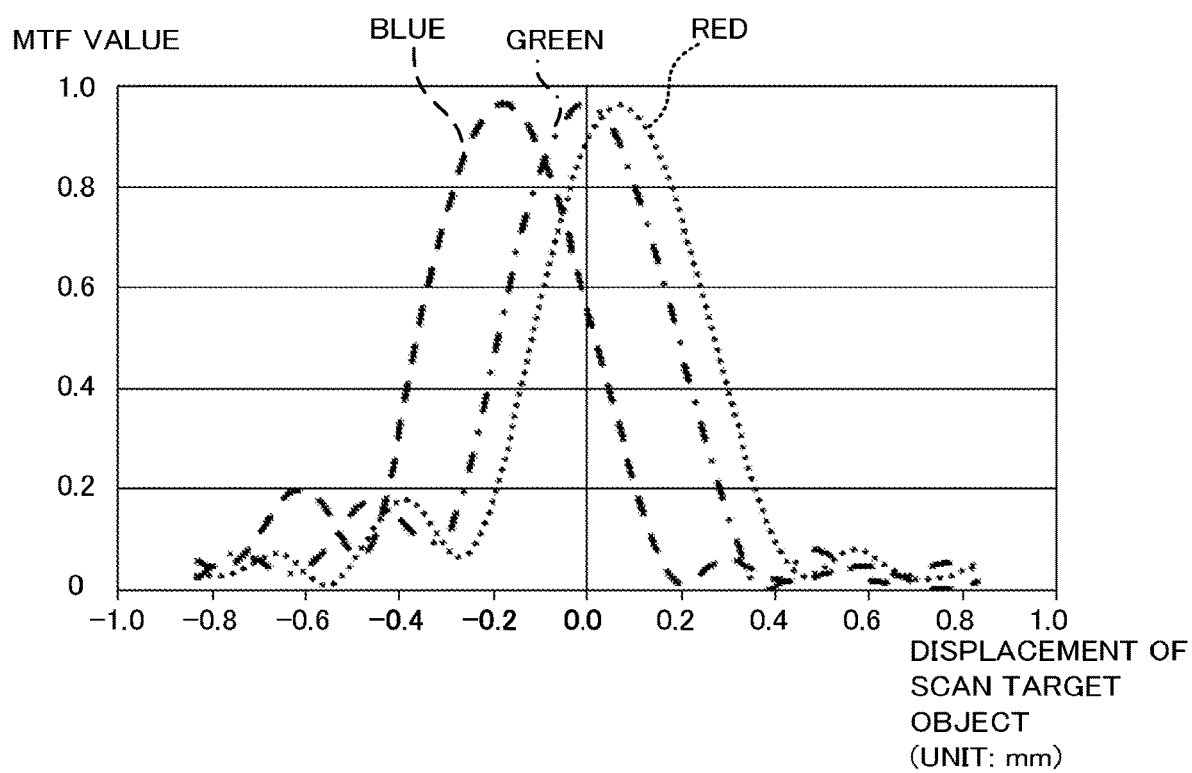
FIG. 17 illustrates an example relationship between a displacement of the scan target object and an MTF value.

FIG. 17 illustrates an example relationship between a displacement of the scan target object 2 and an MTF value. FIG. 17 illustrates an example relationship between an MTF value and a displacement of the scan target object 2 at 420 dpi, involving a spatial frequency corresponding to the MTF value of 0. In the example in FIG. 17, a blue light beam is indicated by a broken line, a green light beam is indicated by a dashed-dotted line, and a red light beam is indicated by a dotted line. The absolute value of a displacement of the scan target object 2 corresponding to the MTF value of 0 in FIG. 17 is smaller than the absolute value of a displacement of the scan target object 2 corresponding to the MTF value of 0 in FIG. 12. In other words, even when a distance shifted from the focus position is short compared with the example in FIG. 12, the MTF value drops abruptly. As described above, when the depth of field includes a position corresponding to the MTF value of 0, the image cannot be restored properly by blur correction. To avoid this, the depth of field should be set so as to exclude a position corresponding to the MTF value of 0, with the result that extension of the depth of field is limited.

Figure 18:
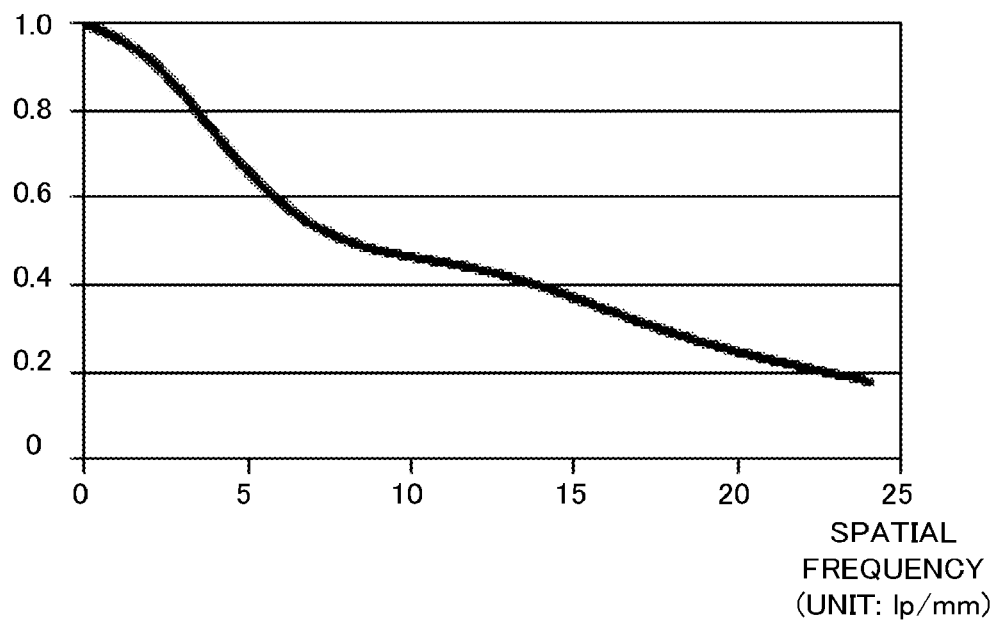
FIG. 18 illustrates an example relationship between a spatial frequency and an MTF value in Embodiment 2.
Figure 19:
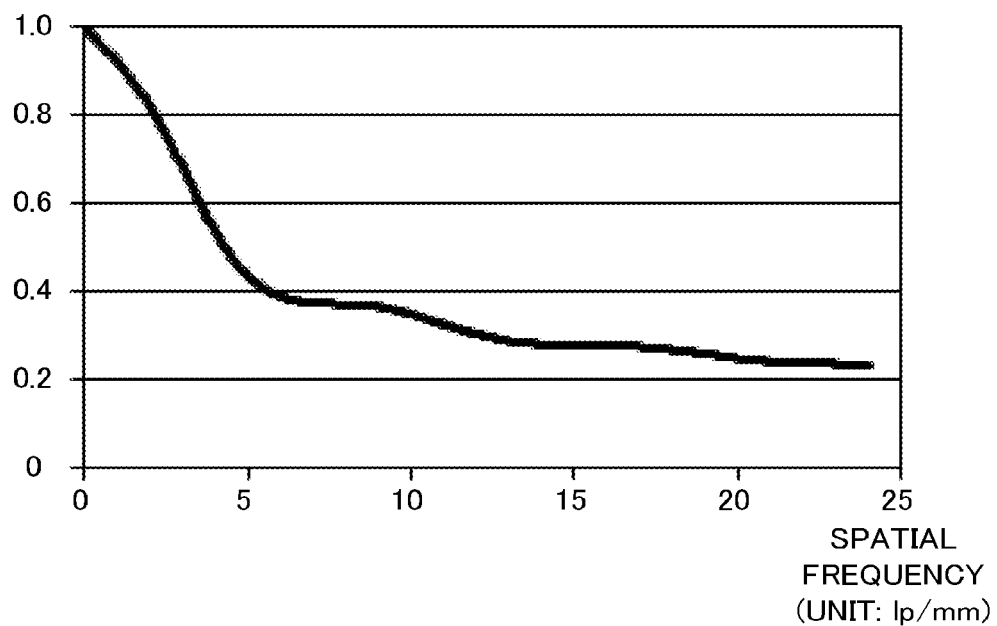
FIG. 19 illustrates an example relationship between a spatial frequency and an MTF value in Embodiment 2.

The following describes MTF values with WFC applied. FIGS. 18 and 19 each illustrate a relationship between a spatial frequency and an MTF value in Embodiment 2. Explanations of the figures are the same as those of FIGS. 15 and 16. FIG. 18 illustrates an example relationship between a spatial frequency and an MTF value in Embodiment 2 in the case where the scan target object 2 is at the focus position. FIG. 19 illustrates an example relationship between a spatial frequency and an MTF value in Embodiment 2 in the case where the scan target object 2 is shifted from the focus position. When WFC is applied, the MTF value falls as the spatial frequency increases, irrespective of whether the scan target object 2 is at a focus position. However, when WFC is applied, the MTF value does not drop to 0 at any spatial frequency in a range of spatial frequencies shown in FIG. 19. In other words, there is no loss of image data at any spatial frequency. Hence, an image can be restored properly by blur correction. Since the MTF value does not drop to 0 at any spatial frequency, the depth of field can be extended.

Any phase modulation method may be used, such as the phase modulation based on spherical aberration using a quadric function and a quartic function or the phase modulation based on coma aberration using a cubic function. In the case of using a cubic function, in order to give an asymmetric phase to the incident light, rotation of a phase plane of the optical system 33 needs to be adjusted when the optical system 33 is assembled. Therefore, it is desirable to employ the phase modulation based on spherical aberration using a quadric function and a quartic function because such phase modulation can give a symmetric phase to the incident light. For example, the amount of phase modulation z can be expressed by the equation (4) below. In the equation (4) below, a and b are coefficients. For example, a=0.02 and b=0.05. In the equation (4) below, r is a radial distance from the optical axis.

$$z = \varphi(r) = ar^2 + br^4 \tag{4}$$

On the basis of the amount of phase modulation z expressed by the equation (4) above, phase modulation of the incident light can be done by changing the thickness of the face of the second lens 44 facing the first lens 41, depending on the radial distance from the optical axis. The thickness of the second lens 44 need only be changed without any additional member disposed for phase modulation, which contributes to preventing an increase in the number of parts. Phase modulation can be done by changing the thickness irrespective of whether the face of the second lens 44 facing the first lens 41 is a transparent member, such as glass or resin, or any other lens face. Phase modulation takes place on the face of the second lens 44 facing the first lens 41. Thus, a constant level of phase modulation can be done onto light beams without regard to the position of the imaging element 36 on the sensor 34. The face of the second lens 44 facing the first lens 41, namely the phase modulation surface, is preferably placed closer to the aperture 43.

Figure 20:
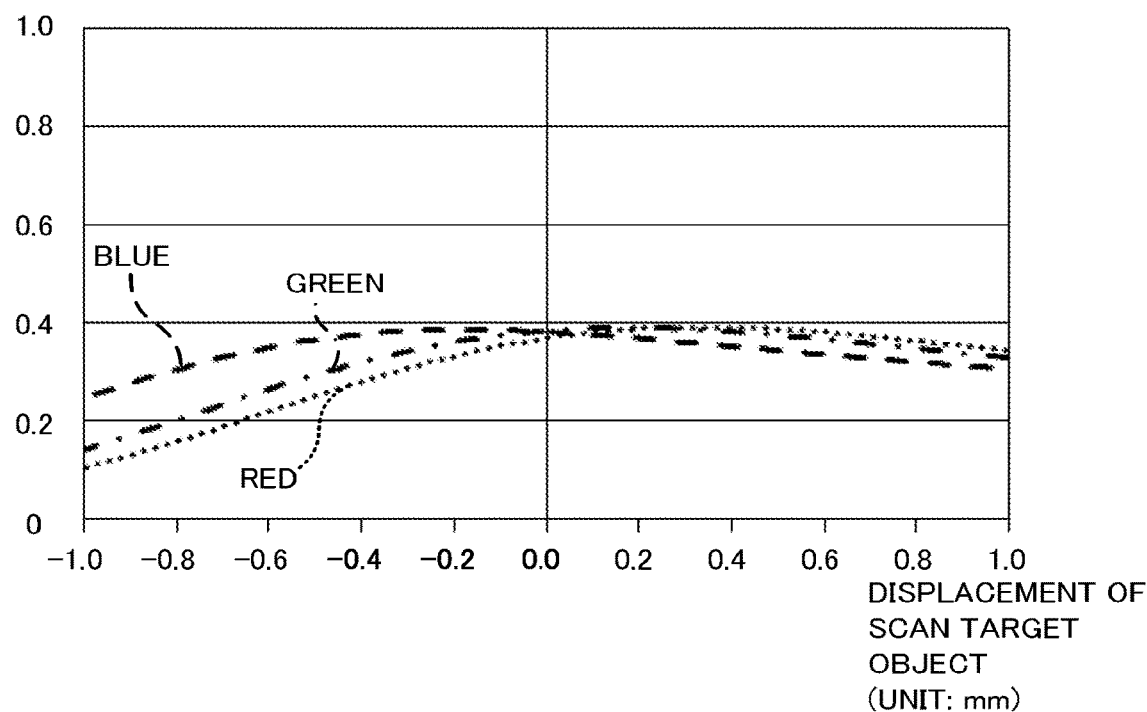
FIG. 20 illustrates an example relationship between a displacement of the scan target object and an MTF value.

FIG. 20 illustrates an example relationship between a displacement of the scan target object 2 and an MTF value in Embodiment 2. Explanations of the figure are the same as those of FIG. 12. In the example in FIG. 20, a blue light beam is indicated by a broken line, a green light beam is indicated by a dashed-dotted line, and a red light beam is indicated by a dotted line. Compared with the case without WFC, applying WFC causes MTF values to be lower. However, compared with FIG. 12, a positional difference of the scan target object 2 among the R, G, and B color components is smaller when an MTF value takes its peak. That is, applying WFC reduces chromatic aberration.

Figure 21:
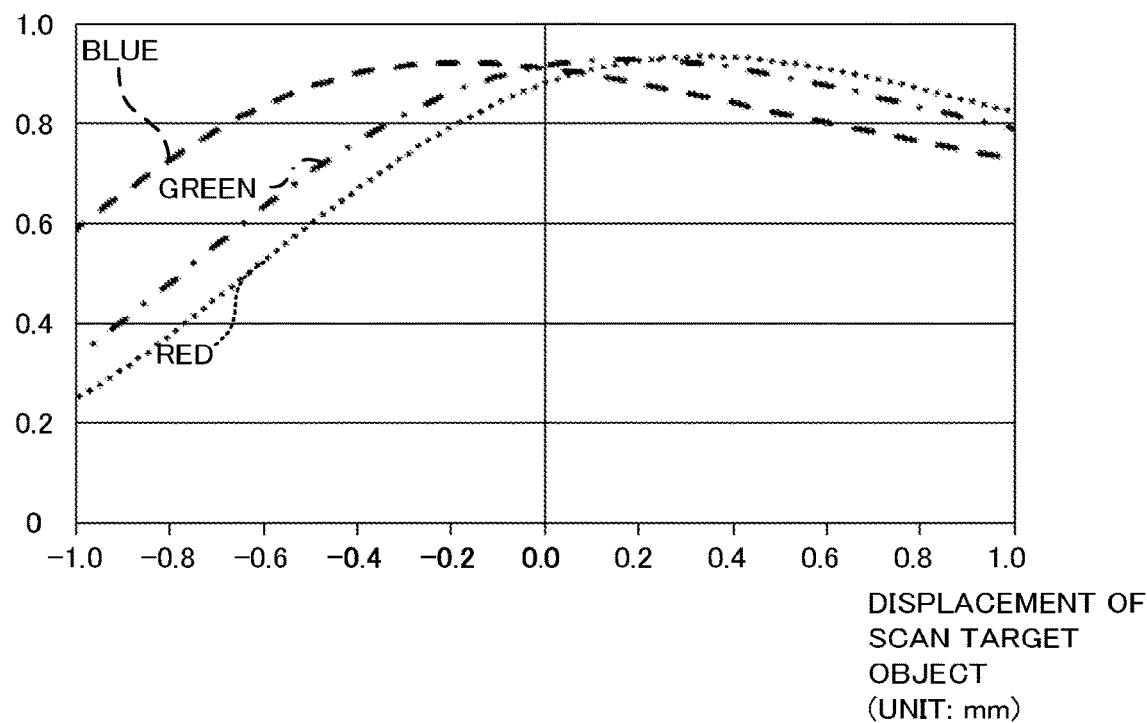
FIG. 21 illustrates an example relationship between a displacement of the scan target object and an MTF value.
Figure 22:
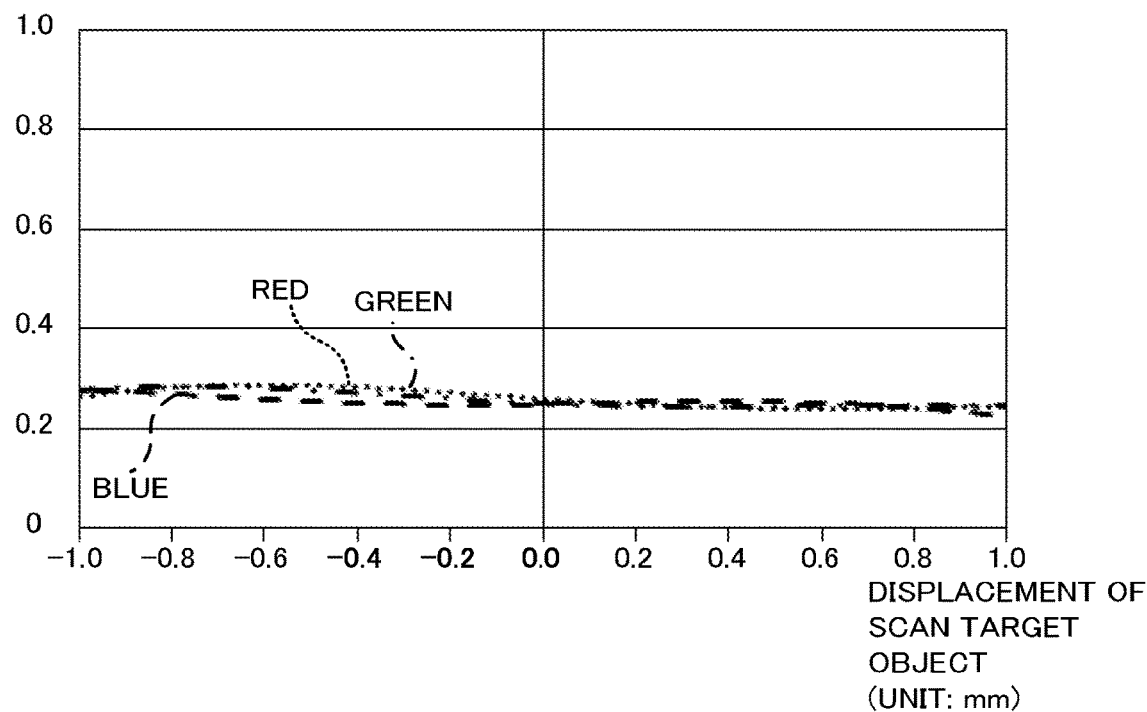
FIG. 22 illustrates an example relationship between a displacement of the scan target object and an MTF value.
Figure 23:
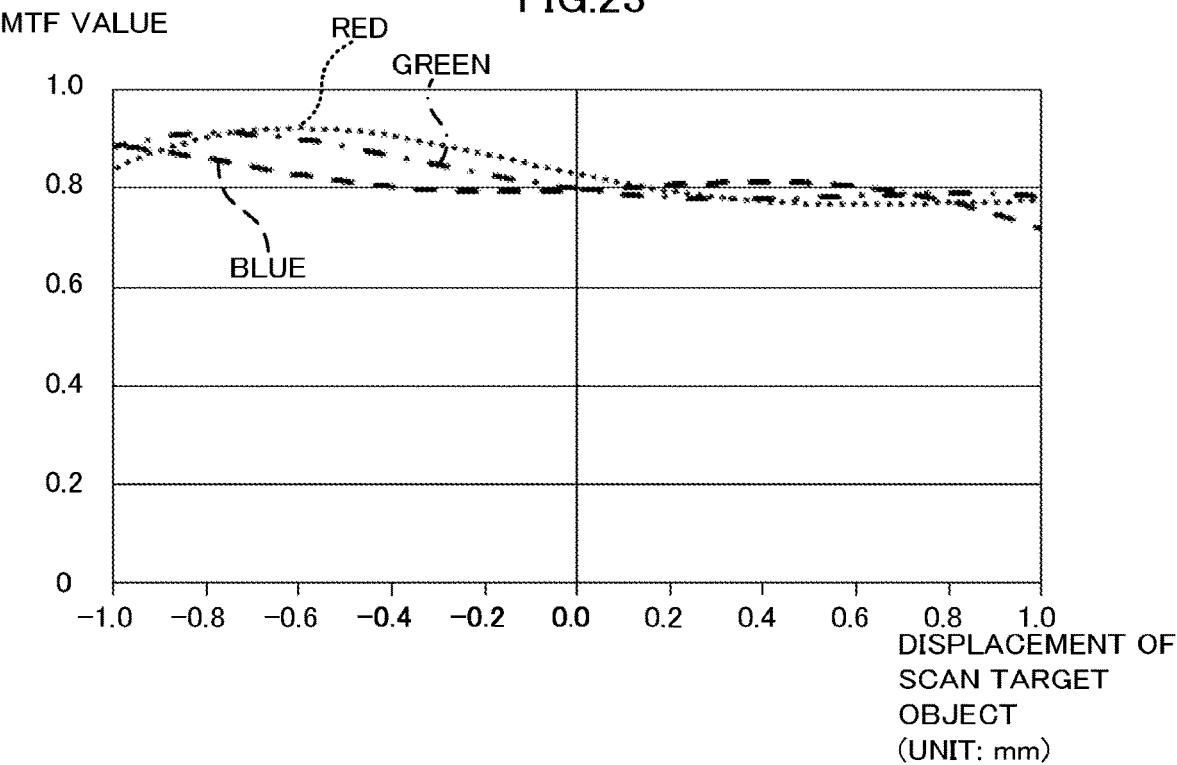
FIG. 23 illustrates an example relationship between a displacement of the scan target object and an MTF value.

FIGS. 21 to 23 each show an example relationship between a displacement of the scan target object 2 and an MTF value. Explanations of the figures are the same as those of FIG. 12. In the examples in FIGS. 21 to 23, a blue light beam is indicated by a broken line, a green light beam is indicated by a dashed-dotted line, and a red light beam is indicated by a dotted line. FIG. 21 illustrates an example relationship between a displacement of the scan target object 2 and an MTF value in the case where phase modulation is done and then blur correction is performed using a PSF that is independent of the R, G, and B color components. Since blur correction is performed uniformly onto the R, G, and B color components, differences among MTF values corresponding to the R, G, and B color components extend, and correction of chromatic aberration fails.

A possible solution to reducing differences among MTF values corresponding to the R, G, and B color components prior to blur correction may be increasing the coefficients a and b in the equation (4) above. FIG. 22 illustrates an example relationship between a displacement of the scan target object 2 and an MTF value in the case where the coefficients a and b are higher than those described above. In the example in FIG. 22, as compared with FIG. 12, a positional difference of the scan target object 2 among the R, G, and B color components is smaller when an MTF value takes its peak. FIG. 23 illustrates an example relationship between a displacement of the scan target object 2 and an MTF value in the case where the coefficients a and b are still higher than those described above, and blur correction is performed using a PSF that is independent of the R, G, and B color components. As a result of increasing the coefficients a and b, a difference among MTF values corresponding to the R, G, and B color components is prevented from increasing even after blur correction. As the coefficients a and b are increased, MTF values before blur correction are lowered. Thus, to make MTF values closer to 1 through blur correction, the restoration magnification needs to be increased. However, a larger restoration factor amplifies a noise component to raise the possibility of causing ringing. In other words, the quality of a restored image may be impaired.

For this reason, the image reading device 1 according to Embodiment 2 performs blur correction using PSFs for their corresponding color components as in Embodiment 1 after the processing in the imager 11 that includes the second lens 44, without increasing the coefficients a and b. By performing blur correction using PSFs for their corresponding color components, a difference among MTF values corresponding to the R, G, and B color components is prevented from increasing. In other words, without increasing the coefficients a and b, chromatic aberration can be corrected with improved accuracy by conducting phase modulation followed by blur correction using PSFs for their corresponding color components, the PSFs being dependent on a displacement of the scan target object 2. In this case, ringing does not occur.

The image reading device 1 repeats the process similar to that in Embodiment 1 while the scan target object 2 is conveyed in the sub-scanning direction, thereby providing a two-dimensional composite image. The image reading device 1 according to Embodiment 2 conducts phase modulation, and then performs blur correction using PSFs for their corresponding color components, the PSFs being dependent on a displacement of the scan target object 2 along the optical axis direction relative to the focus position. Conducting phase modulation on the light entering the second lens 44 makes it possible to extend the depth of field. In addition, performing blur correction using PSFs for their corresponding color components makes it possible to obtain a composite image in which axial chromatic aberration is corrected.

As described above, the image reading device 1 according to Embodiment 2 can extend the depth of field and correct chromatic aberration with improved accuracy in the extended depth of field.

Embodiment 3

Figure 24:
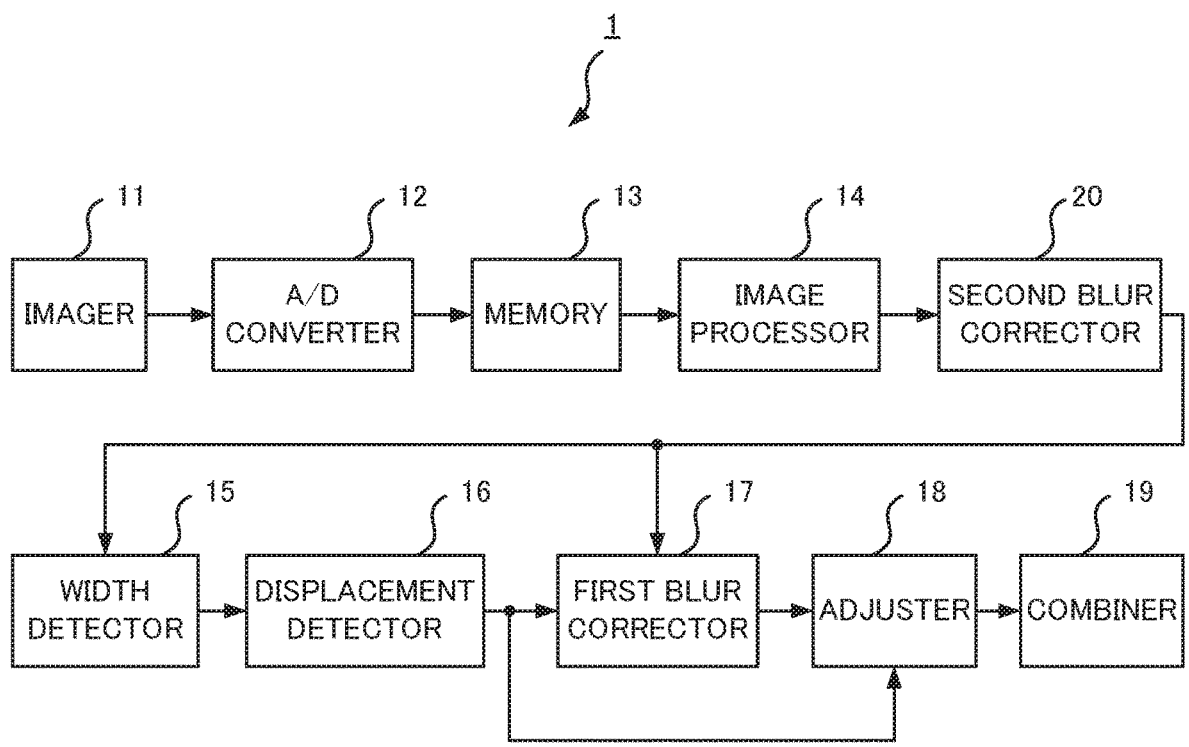
FIG. 24 is a block diagram illustrating an example configuration of an image reading device according to Embodiment 3 of the present disclosure.

As illustrated in FIG. 24, the image reading device 1 according to Embodiment 3 includes a second blur corrector 20 in addition to the components of the image reading device 1 according to Embodiment 2. Configuration of the optical system 33 included in the imager 11 according to Embodiment 3 is similar to that of the optical system 33 included in the imager 11 according to Embodiment 2 as illustrated in FIG. 13. The second blur corrector 20 performs blur correction on the image data that has undergone image processing in the image processor 14, by using a fixed PSF that is independent of any displacement of the scan target object 2. The width detector 15 detects the width of the duplicate area along the main scanning direction in overlapping image data pieces on the basis of the image data that has undergone blur correction performed by the second blur corrector 20. The subsequent processes are the same as those in Embodiment 1.

Figure 25:
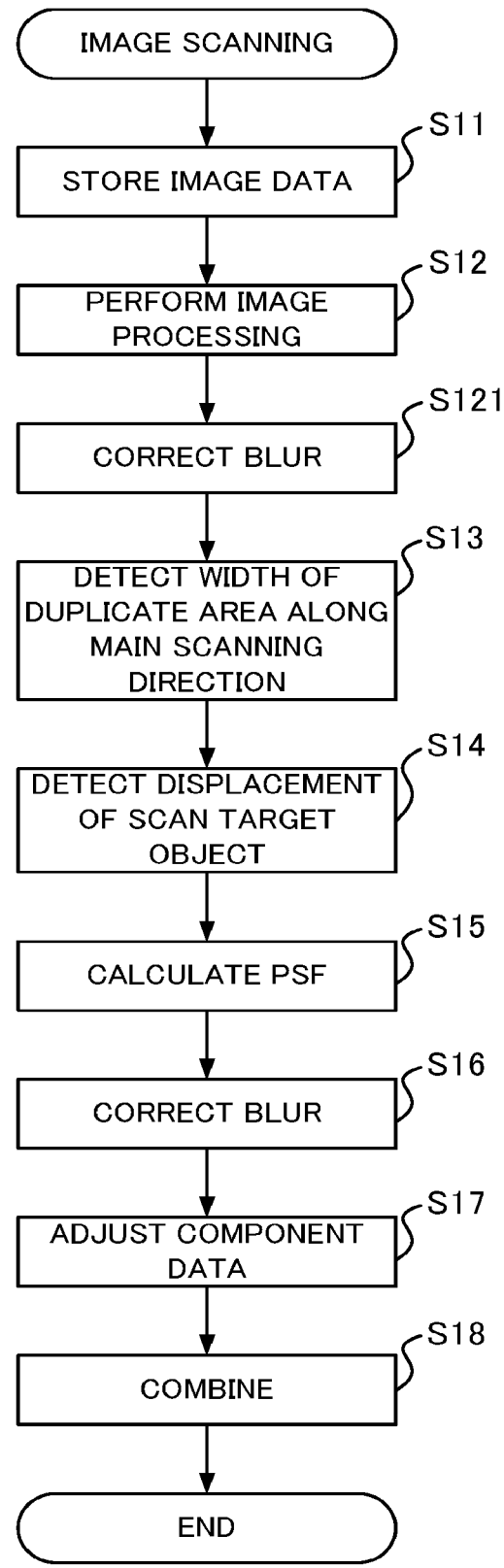
FIG. 25 is a flowchart illustrating an example image scanning process performed by the image reading device according to Embodiment 3.

FIG. 25 is a flowchart illustrating an example image scanning process performed by the image reading device 1 according to Embodiment 3. The processes in steps S11 and S12 are the same as those in steps S11 and S12 performed by the image reading device 1 according to Embodiment 1 as illustrated in FIG. 5. The second blur corrector 20 performs blur correction on the image data using a PSF that is independent of any displacement of the scan target object 2 (step S121). The processes in steps S13 to S18 are the same as those in steps S13 to S18 performed by the image reading device 1 according to Embodiment 1 as illustrated in FIG. 5. In step S13, however, the width detector 15 detects the width of the duplicate area along the main scanning direction on the basis of the image data that has undergone blur correction performed by the second blur corrector 20.

As with Embodiment 2, phase modulation is conducted on the light entering the second lens 44. Thus, the image data that has undergone image processing in the image processor 14 is blurred. Blur correction performed by the second blur corrector 20 restores information of high spatial frequencies. Thus, the width detector 15 can perform the processing with improved accuracy. As the width detector 15 can detect the width of the duplicate area along the main scanning direction with improved accuracy, the displacement detector 16 can detect a displacement of the scan target object 2 with improved accuracy. As a result, the first blur corrector 17 can perform blur correction based on a more accurate PSF. In other words, the image reading device 1 can correct chromatic aberration with improved accuracy.

As a PSF that is independent on a displacement of the scan target object 2, the second blur corrector 20 uses, for example, an average value of PSFs that are for their corresponding color components and dependent on a displacement of the scan target object 2, a PSF applicable to the focus position of the optical system 33, or the like. The second blur corrector 20 may perform blur correction using PSFs for their corresponding color components, the PSFs being independent of a displacement of the scan target object 2.

The image reading device 1 repeats the process similar to that in Embodiment 1 while the scan target object 2 is conveyed in the sub-scanning direction, thereby providing a two-dimensional composite image. The image reading device 1 according to Embodiment 3 conducts phase modulation on the light entering the second lens 44, and then performs blur correction using a PSF that is independent of a displacement of the scan target object 2, followed by detection of the width of the duplicate area along the main scanning direction. Then, the image reading device 1 calculates, based on the width of the duplicate area along the main scanning direction, a displacement of the scan target object 2 along the optical axis direction relative to the focus position, and performs blur correction using PSFs for their corresponding color components, the PSFs being dependent on the displacement. Conducting phase modulation on the light entering the second lens 44 makes it possible to extend the depth of field. In addition, performing blur correction using PSFs for their corresponding color components makes it possible to obtain a composite image in which axial chromatic aberration is corrected.

As described above, the image reading device 1 according to Embodiment 3 makes it possible to correct chromatic aberration with improved accuracy by conducting phase modulation on the light entering the second lens 44, and then performing blur correction using a PSF that is independent of a displacement of the scan target object 2, followed by detection of the width of the duplicate area along the main scanning direction.

Embodiment 4

Figure 26:
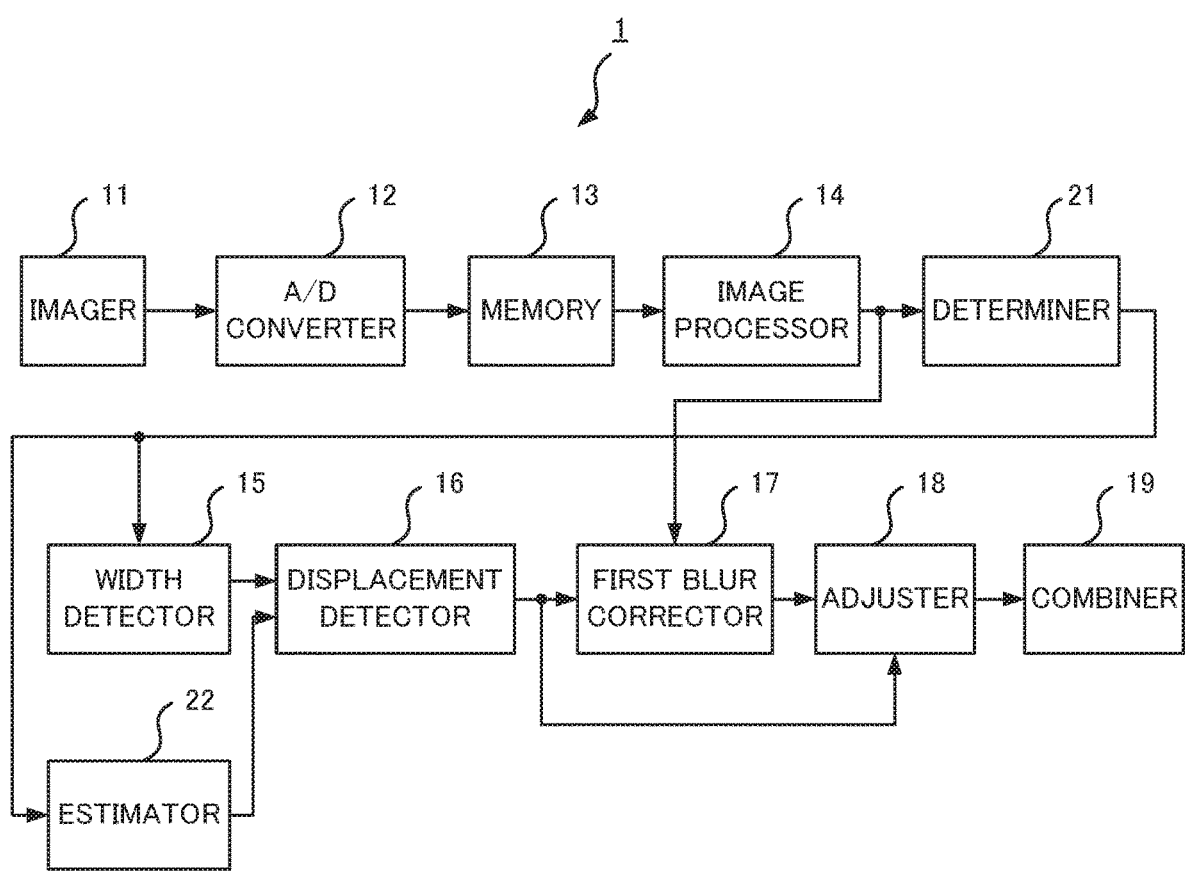
FIG. 26 is a block diagram illustrating an example configuration of an image reading device according to Embodiment 4 of the present disclosure.

FIG. 26 is a block diagram illustrating an example configuration of the image reading device 1 according to Embodiment 4 of the present disclosure. The image reading device 1 according to Embodiment 4 includes a determiner 21 and an estimator 22 in addition to the components of the image reading device 1 according to Embodiment 1. The determiner 21 determines whether the width detector 15 is allowed to perform the processing. The estimator 22 estimates the width of the duplicate area along the main scanning direction.

If the image data generated by adjoining sensors 34 indicates images that include a distinctive design on an edge of each image as illustrated in FIGS. 8 and 9, the width detector 15 can detect the width of the duplicate area along the main scanning direction with high accuracy. However, for example if the same pattern image appears repeatedly on an edge of the image data or if the image data has a plain edge with no markings, it is difficult to detect the width of the duplicate area along the main scanning direction with high accuracy. In particular, if the image data indicates an image that includes the same pattern image appearing repeatedly on an edge, the width detector 15 would match wrong pattern images to detect a wrong matching position. As a result, the width detector 15 may detect the width of a wrong duplicate area along the main scanning direction. If the width detector 15 inaccurately detects the width of the duplicate area along the main scanning direction, the displacement detector 16 may subsequently detect a wrong displacement of the scan target object 2. Consequently, the first blur corrector 17 performs blur correction using PSFs for their corresponding color components, the PSFs being dependent on a wrong displacement of the scan target object 2. If MTF values show different tendencies between a position closer to the optical system 33 than a focus position and a position more distant from the optical system 33 than the focus position, chromatic aberration may become worse as a result of blur correction with PSFs for their corresponding color components, the PSFs being dependent on a wrong displacement of the scan target object 2.

To avoid detecting the width of a wrong duplicate area along the main scanning direction, the determiner 21 included in the image reading device 1 according to Embodiment 4 determines whether the duplicate area is uniquely identifiable. Specifically, the determiner 21 determines whether the matching position in images indicated by image data is uniquely identifiable. When the determiner 21 determines that the matching position is uniquely identifiable, the image reading device 1 goes to the step handled by the width detector 15. When the determiner 21 determines that the matching position is not uniquely identifiable, the image reading device 1 goes to the step handled by the estimator 22 to estimate the width of the duplicate area along the main scanning direction. For each of the optical systems 33, the displacement detector 16 detects a displacement of the scan target object 2 along the optical axis direction relative to the focus position of the optical system 33 on the basis of either the width of the duplicate area along the main scanning direction detected by the width detector 15 or the width of the duplicate area along the main scanning direction estimated by the estimator 22.

Figure 27:
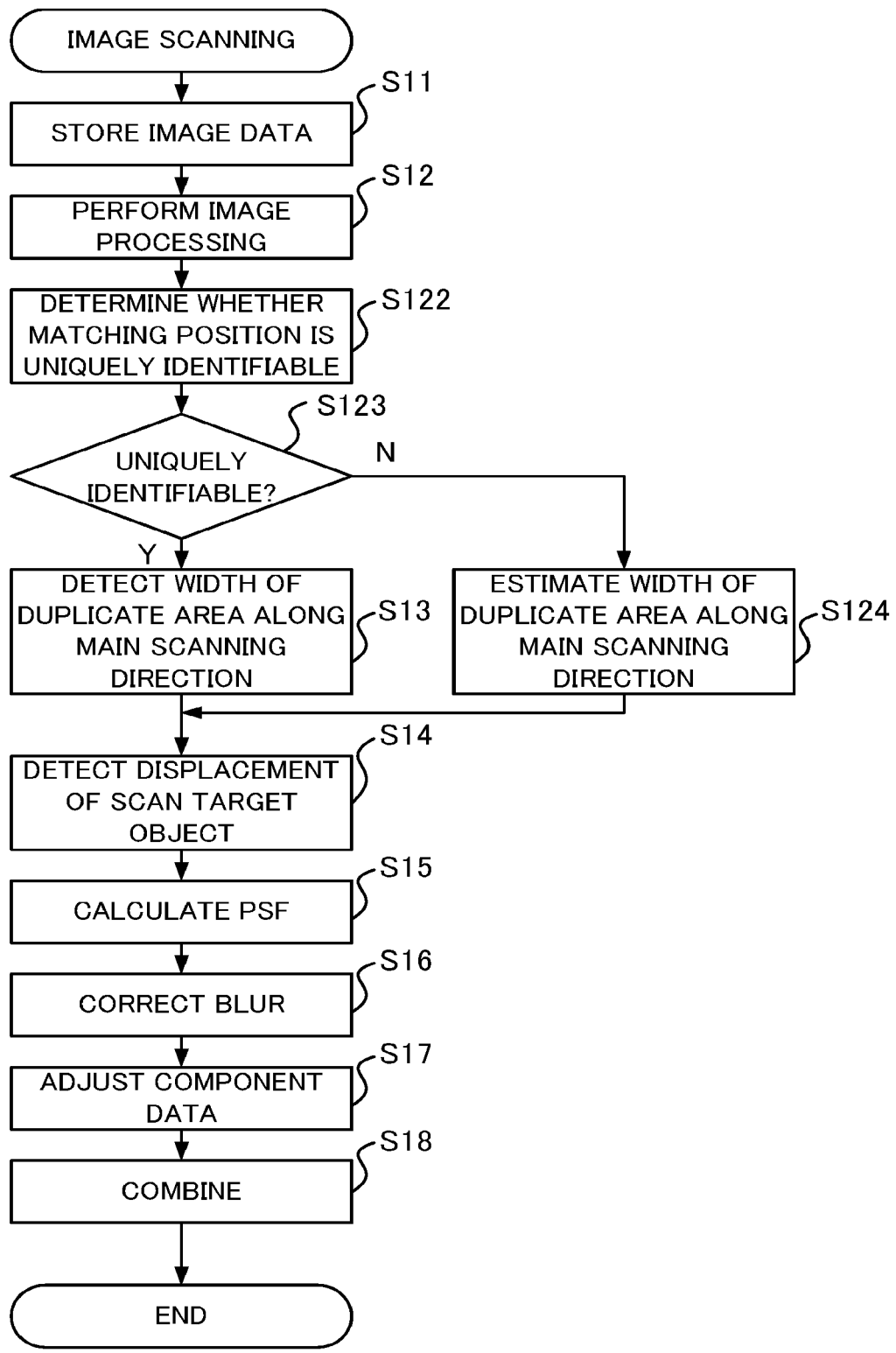
FIG. 27 is a flowchart illustrating an example image scanning process performed by the image reading device according to Embodiment 4.

FIG. 27 is a flowchart illustrating an example image scanning process performed by the image reading device 1 according to Embodiment 4. The processes in steps S11 and S12 are the same as those in steps S11 and S12 performed by the image reading device 1 according to Embodiment 1 as illustrated in FIG. 5. The determiner 21 determines whether the matching position is uniquely identifiable (step S122). When the determiner 21 determines that the matching position is uniquely identifiable (Y in step S123), the processing goes to step S13. The process in step S13 is the same as that in step S13 performed by the image reading device 1 according to Embodiment 1 as illustrated in FIG. 5. When the determiner 21 determines that the matching position is not uniquely identifiable (N in step S123), the processing goes to step S124. The estimator 22 estimates the width of the duplicate area along the main scanning direction (step S124). When either step S13 or S124 is finished, the processing goes to step S14. The processes in steps S14 to S18 are the same as those in steps S14 to S18 performed by the image reading device 1 according to Embodiment 1 as illustrated in FIG. 5.

The determiner 21 extracts an edge of each of images indicated by image data generated by adjoining sensors 34, compares pixels included in each edge to calculate a difference between these edges, and detects a matching position having a difference between edges equal to or less than a threshold. If pixels in the edges have a uniform brightness value, the determiner 21 cannot detect the matching position. In this case, the determiner 21 determines that the process to be handled by the width detector 15 cannot be performed. If the image data includes the same pattern image appearing repeatedly on an edge, the determiner 21 detects a plurality of matching positions in this process. When a plurality of matching positions is detected, which means a matching position is not uniquely identifiable, the determiner 21 determines that the process to be handled by the width detector 15 cannot be performed.

When the matching position is not uniquely identifiable between images indicated by the image data generated by adjacent sensor 34, another matching position may be uniquely identifiable between images indicated by image data generated by other adjoining sensors 34. In this case, the estimator 22 may estimate the width of the duplicate area along the main scanning direction between the images in which the matching position is not uniquely identifiable, on the basis of the width of the duplicate area along the main scanning direction as calculated from the images in which the matching position is uniquely identifiable.

In addition, the estimator 22 may estimate the width of the duplicate area along the main scanning direction through interpolation on the basis of the image data which has been generated by other adjoining sensors 34 and on which the determiner 21 has determined that the width detector 15 can perform the processing.

Alternatively, the estimator 22 may estimate the width of the duplicate area along the main scanning direction on the basis of a width of the duplicate area along the main scanning direction, the other width being detected when the scan target object 2 is at a focus position of the optical system 33. For example, as an estimated width, the estimator 22 may use the width of the duplicate area along the main scanning direction, the width being measured in advance when the scan target object 2 is at the focus position of the optical system 33, or may use a value obtained by some computation performed on the width of the duplicate area along the main scanning direction, the width being measured when the scan target object 2 is at a focus position of the optical system 33.

Figure 28:
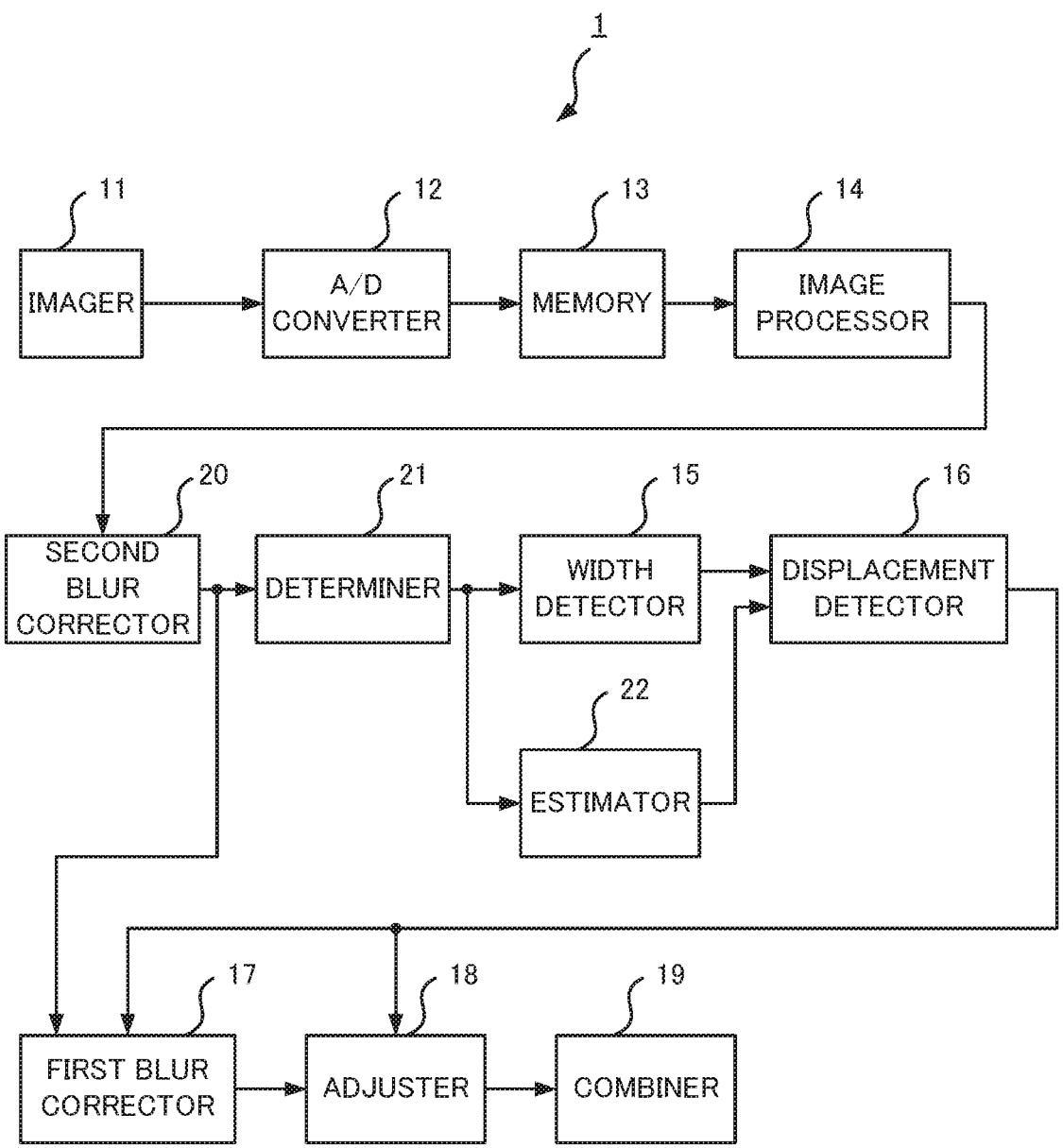
FIG. 28 is a block diagram illustrating another example configuration of the image reading device according to Embodiment 4.

As illustrated in FIG. 28, the image reading device 1 according to Embodiment 4 further includes the determiner 21 and the estimator 22 in addition to the components of the image reading device 1 according to Embodiment 3 in FIG. 24. In the image reading device 1 illustrated in FIG. 28, phase modulation is conducted on the light entering the second lens 44, and then the determiner 21 determines whether the matching position is uniquely identifiable, on the basis of the image data that has undergone blur correction performed by using a PSF that is independent of a displacement of the scan target object 2. The subsequent processes are the same as those in the image reading device 1 as illustrated in FIG. 26.

The image reading device 1 repeats the above-described process while the scan target object 2 is conveyed in the sub-scanning direction, thereby providing a two-dimensional composite image. In the image reading device 1 according to Embodiment 4, the width detector 15 detects the width of the duplicate area along the main scanning direction when the matching position is uniquely identifiable, or the estimator 22 estimates the width of the duplicate area along the main scanning direction when the matching position is not uniquely identifiable. The image reading device 1 calculates, from the detected or estimated width of the duplicate area along the main scanning direction, a displacement of the scan target object 2 along the optical axis direction relative to the focus position, and performs blur correction using PSFs for their corresponding color components, the PSFs being dependent on the displacement. Even when the matching position is not uniquely identifiable, the width of the duplicate area along the main scanning direction can be calculated with improved accuracy by performing the estimation process. As a result, chromatic aberration can be corrected with improved accuracy.

As described above, in the image reading device 1 according to Embodiment 4, the width detector 15 detects the width of the duplicate area along the main scanning direction when the matching position is uniquely identifiable, or the estimator 22 estimates the width of the duplicate area along the main scanning direction when the matching position is not uniquely identifiable, whereby chromatic aberration can be corrected with improved accuracy.

The present disclosure is not limited to the embodiments described above, and any combination of a plurality of embodiments may be used. Color components are not limited to RGB but may be cyan (C), magenta (M), yellow (Y), and black (K), for example. Instead of conveying the scan target object 2, the image reading device 1 may be moved relative to the scan target object 2 that is stationary.

The displacement detector 16 may calculate the width of the duplicate area corresponding to each cell along the main scanning direction, from an average value, an approximate value, a value obtained by interpolation, or the like. For example, the displacement detector 16 may calculate the width W'(k+1) of the duplicate area corresponding to the (k+1)-th cell along the main scanning direction, from an average value of W(k) and W(k+1). Alternatively, the displacement detector 16 may use, as W'(k+1), an approximate value based on W(1) through W(n) or a value obtained by interpolation based on W(k) and W(k+1), or the like. Alternatively, the displacement detector 16 may use the relationship illustrated in FIG. 10 to calculate displacements D'(k) and D'(k+1) of the scan target object 2 corresponding to W(k) and W(k+1), respectively, and calculate a displacement D(k+1) from D'(k) and D'(k+1). The displacement detector 16 uses, as D(k+1), an average value of D(k) and D(k+1), an approximate value based on D(1) through D(n), a value obtained by interpolation based on D(k) and D(k+1), or the like.

In the embodiments described above, the first blur corrector 17 performs blur correction, and then the adjuster 18 adjusts component data pieces. However, the first blur corrector 17 may perform blur correction on the component data pieces that have been adjusted by the adjuster 18. In this case, the size of the filter used for the first blur corrector 17 needs to be adjusted in accordance with the transfer magnification.

A non-telecentric optical system like those in the foregoing embodiments may cause vignetting appearing at an edge of the field of view. When vignetting occurs, chromatic aberration can be corrected with improved accuracy by using PSFs that reflect consideration for vignetting to perform blur correction. The first blur corrector 17 uses the aforementioned PSFs that are dependent on the position of the imaging element 36 on the sensor 34 to perform blur correction on the component data pieces. That is, the first blur corrector 17 performs blur correction on the component data pieces using PSFs for their corresponding color components, the PSFs being calculated depending on the position of the imaging element 36 on the sensor 34 and on a displacement of the scan target object 2. For example, the first blur corrector 17 uses PSFs that are dependent on the position of the imaging element 36 on the sensor 34 in the main scanning direction.

In the examples described above, images in which the matching position is not uniquely identifiable include a plain image and a pattern image appearing repeatedly, but the images are not limited to such plain image or pattern image.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2017-88825, filed on Apr. 27, 2017, the entire disclosure of which is incorporated by reference herein.

REFERENCE SIGNS LIST

1 Image reading device
2 Scan target object
3, 43 Aperture
4 Refractive lens
11 Imager
12 A/D converter
13 Memory
14 Image processor
15 Width detector
16 Displacement detector
17 First blur corrector
18 Adjuster
19 Combiner
20 Second blur corrector
21 Determiner
22 Estimator
31 Transparent body
32a, 32b Light source
33 Optical system
34 Sensor
35 Board
36, 36a, 36b, 36c Imaging element
37 Readout circuit
40 Scanning area
41 First lens
42, 44 Second lens
Pa (k), Pa (k+1), Pb(k), Pb(k+1) Image data

The invention claimed is:

1. An image reading device comprising:
a light source to illuminate an illumination area with light;
sensors arranged in a line and including imaging elements, the sensors being configured to generate, from images formed on the imaging elements, image data containing a component data piece for each of color components;
optical systems provided for the corresponding sensors and arranged along a main scanning direction that is a direction in which the sensors are arranged, the optical systems being configured to cause light being emitted by the light source and scattered on a scan target object in a scanning area in the illumination area to form images on the imaging elements included in the sensors, wherein scanning areas of adjoining optical systems overlap each other;
a width detector to detect a width of a duplicate area along the main scanning direction, the duplicate area being an area in which images indicated by the image data generated by adjoining sensors of the sensors overlap each other;
a displacement detector to detect, for each of the optical systems, a displacement of the scan target object along an optical axis direction relative to a focus position of each of the optical systems based on the width of the duplicate area along the main scanning direction;
a first blur corrector to perform blur correction on each component data piece using a point spread function for each of the color components, the point spread function being dependent on the displacement of the scan target object;
an adjuster to adjust, based on a transfer magnification dependent on the displacement of the scan target object, a size of an image for each of the color components indicated by the respective component data piece; and
a combiner to combine images by superimposing portions of the component data pieces generated by the adjoining sensors, having undergone blur correction by the first blur corrector, and adjusted by the adjuster.

2. The image reading device according to claim 1, wherein
the width detector detects, for each of the color components, the width of the duplicate area along the main scanning direction in images for each of the color components indicated by the component data pieces, the component data pieces being contained in the image data generated by the adjoining sensors,
the displacement detector detects, for each of the color components and each of the optical systems, a displacement of the scan target object along the optical axis direction relative to a focus position of each of the optical systems for the color component, based on the width of the duplicate area along the main scanning direction detected for each of the color components,
the first blur corrector performs blur correction on each component data piece using the point spread function, based on the displacement of the scan target object detected for each of the color components, and
the adjuster adjusts the size of the image for each of the color components indicated by the respective component data piece, based on the transfer magnification dependent on the displacement of the scan target object detected for each of the color components.

3. The image reading device according to claim 1, wherein the first blur corrector performs blur correction on each component data piece using the point spread function dependent on a position of an imaging element relative to the respective sensor.

4. The image reading device according to claim 1, wherein
the optical systems each comprise
a combination lens comprising a first lens and a second lens; and
an aperture disposed between the first lens and the second lens in the optical axis direction, and
the second lens is disposed at a position closer to a sensor than the first lens.

5. The image reading device according to claim 4, wherein the second lens modulates a phase of light entering the second lens.

6. The image reading device according to claim 5, further comprising:
a second blur corrector to perform blur correction on the image data generated by the sensors, by using a point spread function that is independent of the displacement of the scan target object, wherein
the width detector detects a width of a duplicate area along the main scanning direction that is an area in which pieces of the image data generated by the adjoining sensors and having undergone blur correction by the second blur corrector overlap each other,
the first blur corrector performs, using the point spread function for each of the color components, blur correction on each component data piece contained in the image data having undergone blur correction by the second blur corrector,
the adjuster adjusts, based on the transfer magnification dependent on the displacement of the scan target object, the size of the image for each of the color components indicated by the respective component data piece having undergone blur correction by the first blur corrector following blur correction by the second blur corrector, and
the combiner combines images by superimposing portions of the component data pieces generated by the adjoining sensors, having undergone blur correction by the first blur corrector following blur correction by the second blur corrector, and adjusted by the adjuster.

7. The image reading device according to claim 1, further comprising:
a determiner to determine whether the duplicate area is uniquely identifiable; and
an estimator to estimate the width of the duplicate area along the main scanning direction, wherein
processing by the width detector is performed when the determiner determines that the duplicate area is uniquely identifiable,
processing by the estimator is performed when the determiner determines that the duplicate area is not uniquely identifiable, and
the displacement detector detects, for each of the optical systems, a displacement of the scan target object along the optical axis direction relative to a focus position of each of the optical systems, based on the width of the duplicate area along the main scanning direction detected by the width detector or the width of the duplicate area along the main scanning direction estimated by the estimator.

8. The image reading device according to claim 7, wherein the estimator estimates the width of the duplicate area along the main scanning direction, based on the width of the duplicate area along the main scanning direction detected by the width detector.

9. The image reading device according to claim 7, wherein the estimator estimates the width of the duplicate area along the main scanning direction, based on the width of the duplicate area along the main scanning direction, with the scan target object positioned at a focus position of each of the optical systems.

* * * * *